(12) United States Patent
Brady

(10) Patent No.: US 9,364,877 B2
(45) Date of Patent: Jun. 14, 2016

(54) SOIL BOX FOR EVAPORATIVE DESORPTION PROCESS

(71) Applicant: RETERRO, INC., Pleasanton, CA (US)

(72) Inventor: Patrick Richard Brady, Sisters, OR (US)

(73) Assignee: RETERRO INC., Pleasanton, CA (US)

( * ) Notice: Subject to any disclaimer, the term of this patent is extended or adjusted under 35 U.S.C. 154(b) by 144 days.

(21) Appl. No.: 14/264,019

(22) Filed: Apr. 28, 2014

(65) Prior Publication Data

US 2014/0321917 A1    Oct. 30, 2014

Related U.S. Application Data

(60) Provisional application No. 61/817,304, filed on Apr. 29, 2013, provisional application No. 61/840,474, filed on Jun. 28, 2013, provisional application No. 61/878,610, filed on Sep. 17, 2013.

(51) Int. Cl.
*B09C 1/00* (2006.01)
*B09C 1/06* (2006.01)

(52) U.S. Cl.
CPC ........................ *B09C 1/06* (2013.01)

(58) Field of Classification Search
CPC .............. B09C 1/06; B09C 1/005; F23G 7/14
USPC ................. 405/128.7, 128.75, 128.8, 128.85; 34/79
See application file for complete search history.

(56) References Cited

U.S. PATENT DOCUMENTS

| 4,738,206 | A | * | 4/1988 | Noland | 110/346 |
| 4,834,840 | A | * | 5/1989 | Capella | 202/172 |
| 4,842,448 | A | * | 6/1989 | Koerner et al. | 405/128.35 |
| 4,864,942 | A | * | 9/1989 | Fochtman et al. | 110/226 |
| 4,977,839 | A | * | 12/1990 | Fochtman et al. | 110/346 |
| 5,035,537 | A | * | 7/1991 | Rose | 405/128.7 |
| 5,067,852 | A | * | 11/1991 | Plunkett | 405/128.7 |
| 5,213,445 | A | * | 5/1993 | Ikenberry et al. | 405/128.9 |
| 5,228,804 | A | * | 7/1993 | Balch | 405/128.85 |
| 5,230,167 | A | * | 7/1993 | Lahoda et al. | 34/75 |
| 5,261,765 | A | * | 11/1993 | Nelson | 405/128.6 |
| 5,466,418 | A | * | 11/1995 | Swanson et al. | 422/111 |
| 5,639,936 | A | * | 6/1997 | Corte | 405/128.55 |
| 5,836,718 | A | * | 11/1998 | Price | 405/128.8 |
| 5,893,680 | A | * | 4/1999 | Lowry et al. | 405/128.2 |
| 5,904,904 | A | * | 5/1999 | Swanson | 422/182 |
| 6,000,882 | A | * | 12/1999 | Bova et al. | 405/128.85 |
| 7,618,215 | B2 | * | 11/2009 | Haemers et al. | 405/128.8 |
| 8,348,551 | B2 | * | 1/2013 | Baker et al. | 405/128.85 |
| 8,851,066 | B1 | * | 10/2014 | Kapteyn | 126/620 |
| 9,004,817 | B2 | * | 4/2015 | Hanasaka | 405/128.85 |
| 2003/0147697 | A1 | * | 8/2003 | Brady et al. | 405/128.15 |

(Continued)

*Primary Examiner* — Benjamin Fiorello
*Assistant Examiner* — Aaron Lembo

(57) ABSTRACT

Simple flow path with minimum turns for the vapor extraction flow paths can provide maximum air flow with minimal head loss, leading to higher efficiency in a thermal desorption process. Hot air vapor extraction arrangement can include large diameter vertical or horizontal trunk line or curved plate with continuous wire wrap well screens. The vapor extraction trunk can draw all vapors to the center of the soil box, which can reduce the treatment time by substantially removing condensation zone. The interior of the vapor extraction well screen and trunk can include porous material, which can reduce dust within the vapor stream, eliminate potential short circuiting in the event of a screen rupture and reduce potential explosion hazards.

18 Claims, 44 Drawing Sheets

(56) References Cited

U.S. PATENT DOCUMENTS

| | | | |
|---|---|---|---|
| 2014/0321915 A1* | 10/2014 | Brady | 405/128.75 |
| 2014/0321918 A1* | 10/2014 | Brady | 405/128.85 |
| 2014/0377008 A1* | 12/2014 | Desmarais et al. | 405/128.85 |
| 2015/0078827 A1* | 3/2015 | Brady et al. | 405/128.75 |
| 2015/0078828 A1* | 3/2015 | Brady et al. | 405/128.85 |
| 2015/0078829 A1* | 3/2015 | Brady | 405/128.85 |

* cited by examiner

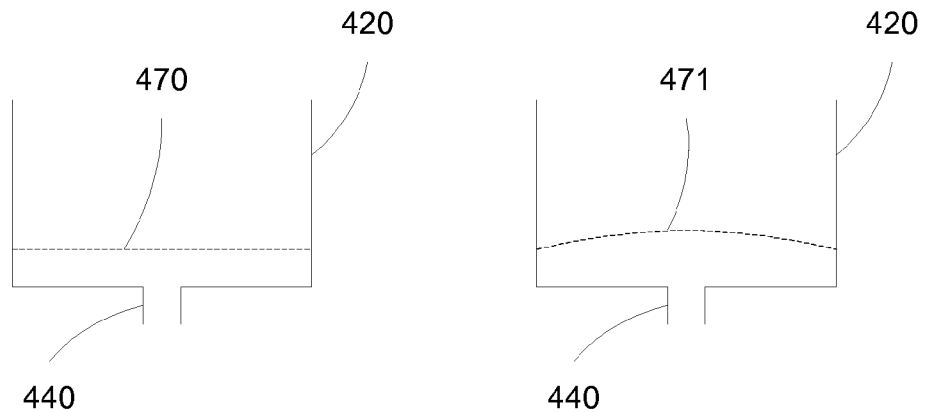
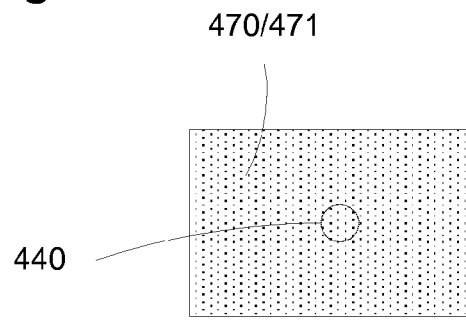
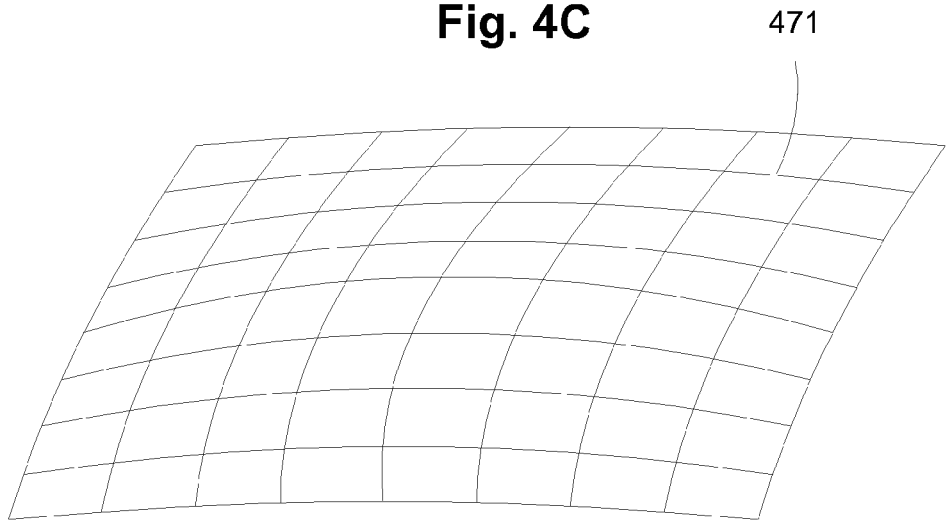
Fig. 4A  Fig. 4B  Fig. 4C  Fig. 4D

Forming a soil box, wherein the soil box comprises an inner volume for containing a material, wherein the soil box comprises an opening
1000

Forming an exhaust outlet for the soil box, wherein the exhaust outlet is configured to contain the material in the soil box, wherein the exhaust outlet is configured so that a gas provided to the opening forms a substantially uniform flow through the material to the exhaust outlet
1010

Fig. 10A

Forming a soil box, wherein the soil box comprises an inner volume for containing a material, wherein the soil box comprises a top opening
1030

Forming an exhaust outlet at a bottom of the soil box
1040

Forming a screen conduit coupled to the exhaust outlet, wherein the screen conduit is configured so that a gas provided to the top opening forms a substantially uniform flow through the material
1050

Fig. 10B

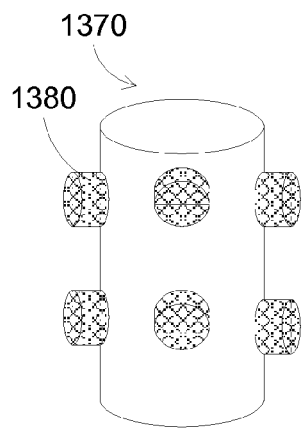 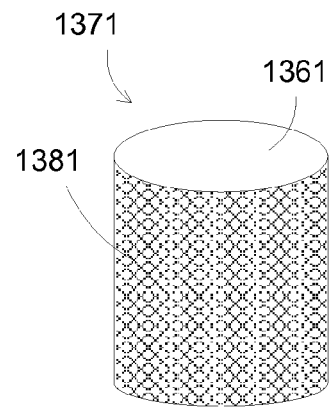
Fig. 13A  Fig. 13B
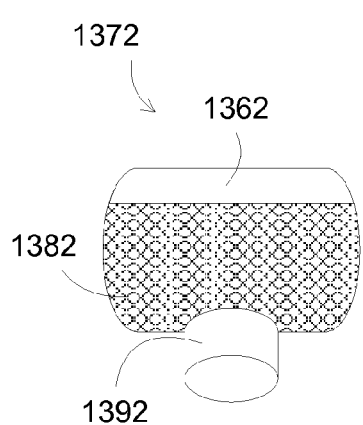 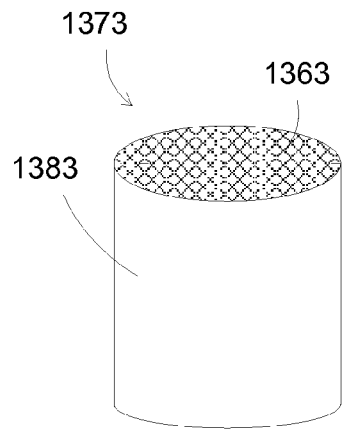
Fig. 13C  Fig. 13D
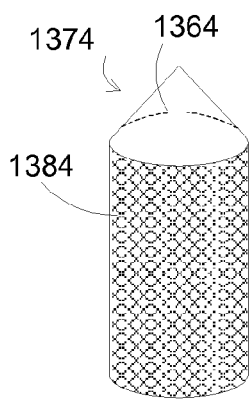 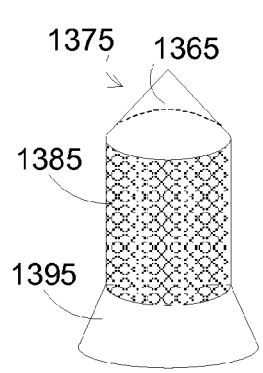 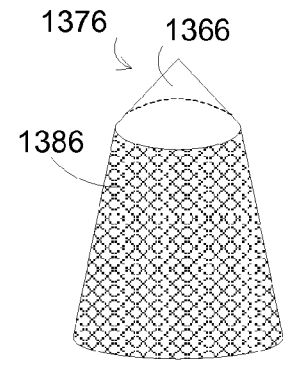
Fig. 13E  Fig. 13F  Fig. 13G

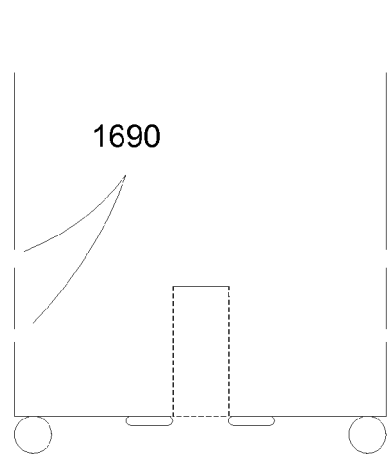
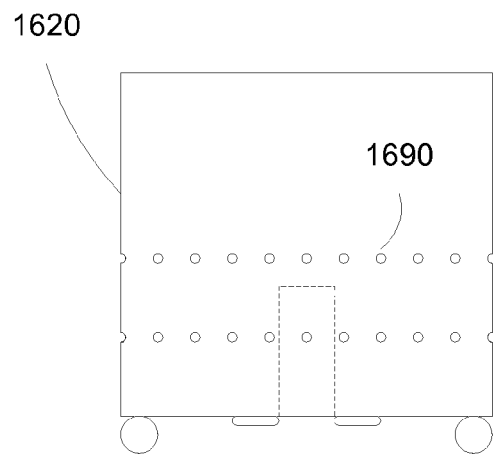
Fig. 16A　　　　Fig. 16B
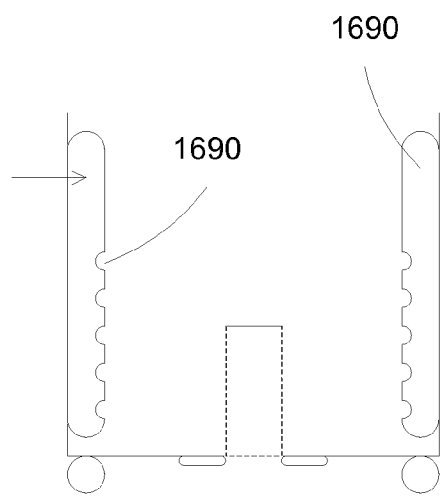
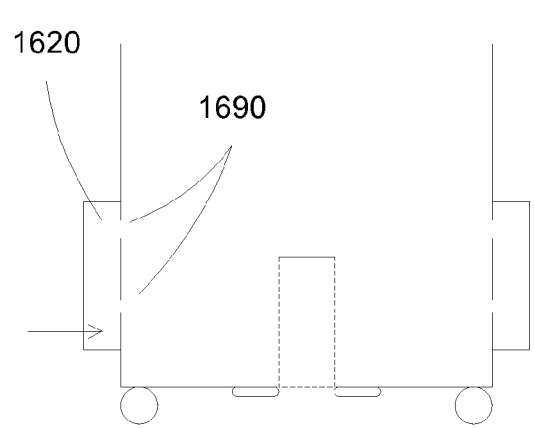
Fig. 16C　　　　Fig. 16D Providing a soil box, wherein the soil box comprises an inner volume for containing a material, wherein the soil box comprises a top opening for accepting the material, wherein the soil box comprises one or more side openings at a sidewall of the soil box
1900

Forming an exhaust outlet for the soil box, wherein the exhaust outlet is configured to contain the material in the soil box, wherein the exhaust outlet is configured so that a gas provided to the top and side openings forms a substantially uniform flow through the material to the exhaust outlet
1910

Fig. 19A

Providing a soil box, wherein the soil box comprises an inner volume for containing a material, wherein the soil box comprises a top opening for accepting the material, wherein the soil box comprises one or more side openings at a sidewall of the soil box
1930

Forming an exhaust outlet at a bottom of the soil box
1940

Forming a screen conduit coupled to the exhaust outlet, wherein the screen conduit is configured so that a gas provided to the top and side openings forms a substantially uniform flow through the material
1950

Fig. 19B

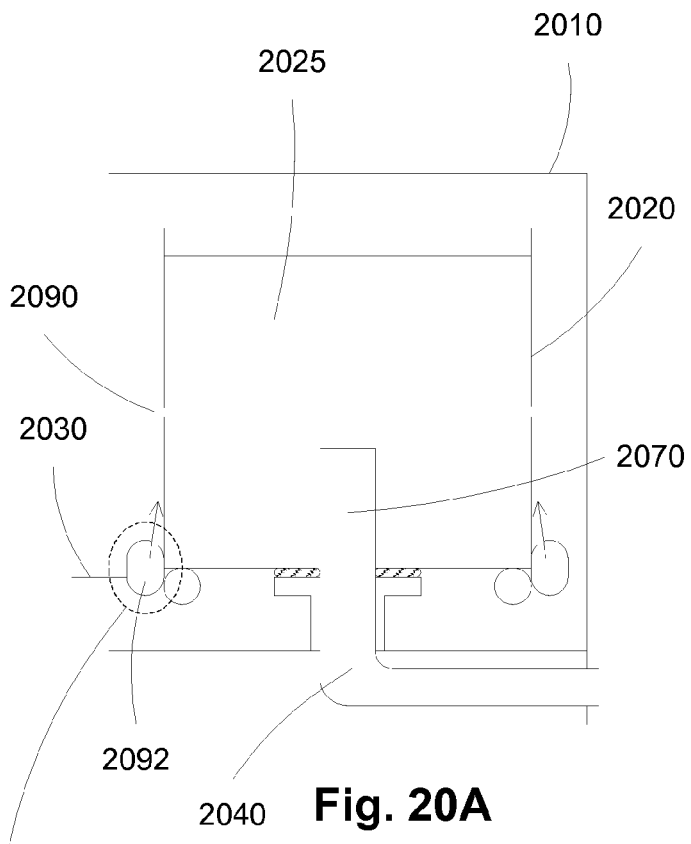
Fig. 20A
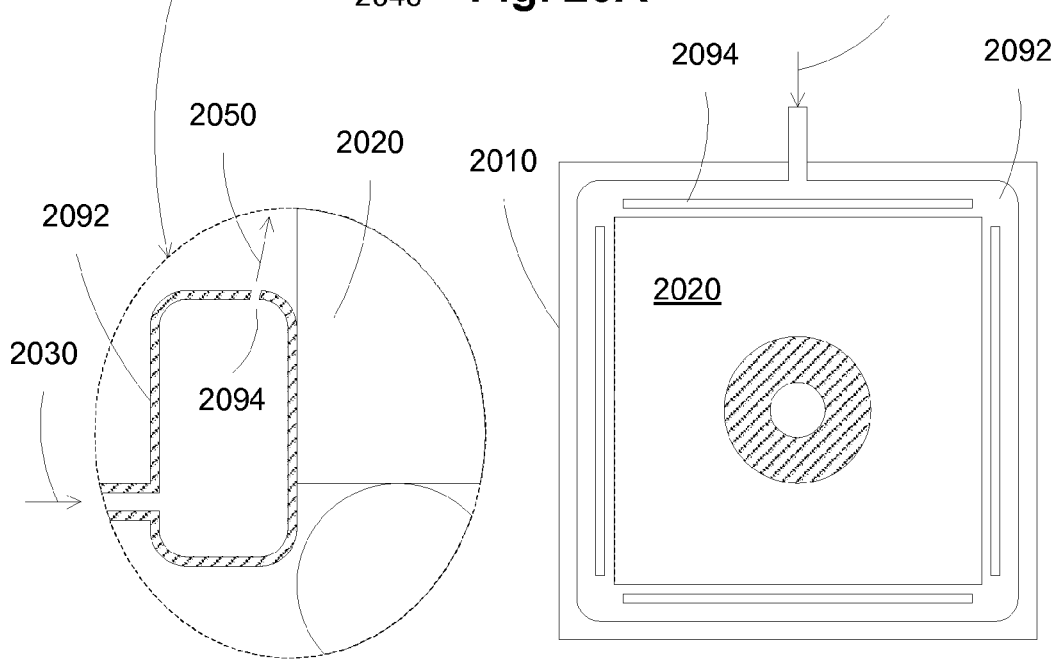
Fig. 20B  Fig. 20C

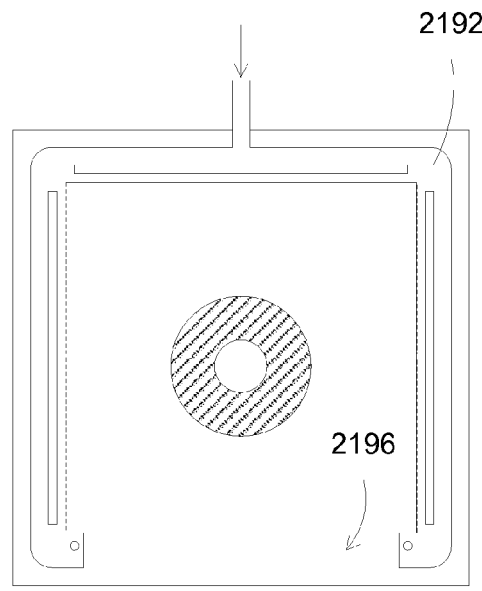
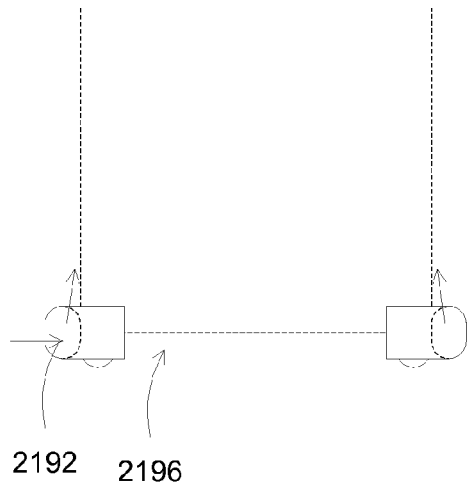
Fig. 21A Fig. 21B
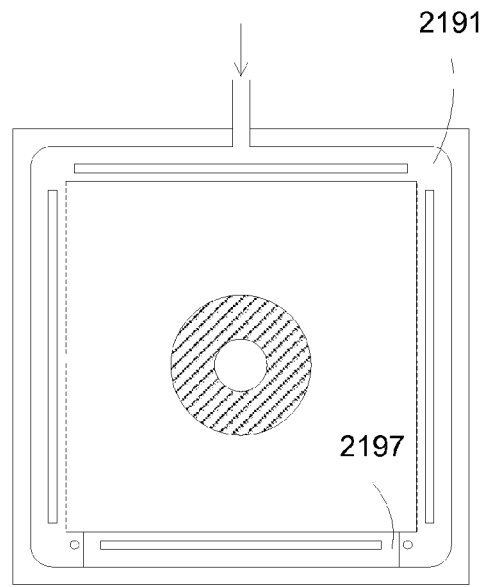
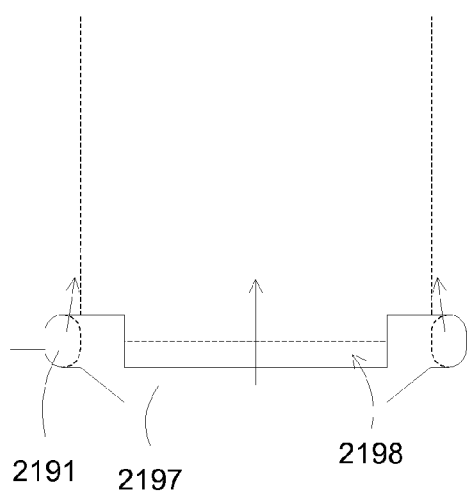
Fig. 21C Fig. 21D

Forming a treatment chamber, wherein the treatment chamber is configured to contain a soil box
2300

Forming a cradle in the treatment chamber, wherein the cradle is configured to form a mating landing area for the soil box, wherein the cradle is hollow for accepting a treatment gas to be delivered to a sidewall of the soil box
2310

Fig. 23A

Loading contaminated soil into a soil box
2330

Bringing the loaded soil box to a treatment chamber
2340

Placing the soil box on a cradle in the treatment chamber, wherein soil box is mated to the cradle, wherein the cradle is hollow for accepting a treatment gas to be delivered to a sidewall of the soil box
2350

Fig. 23B

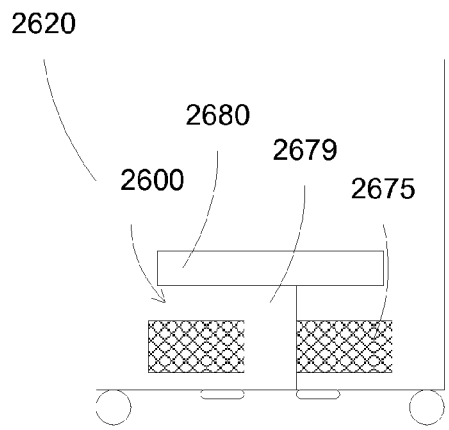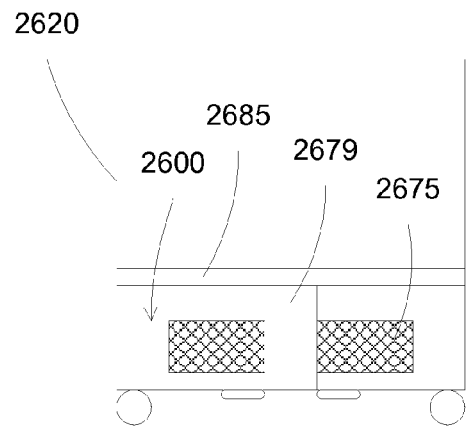
Fig. 26A             Fig. 26D
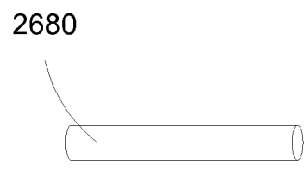
Fig. 26B             Fig. 26E
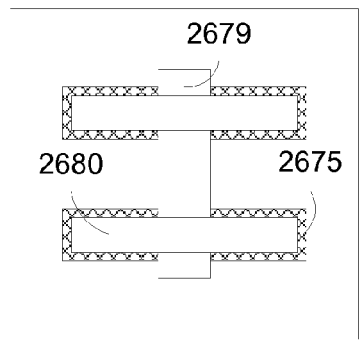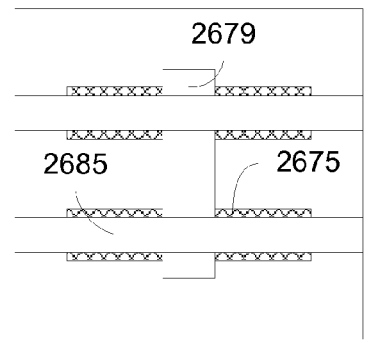
Fig. 26C             Fig. 26F Providing a soil box, wherein the soil box comprises an inner volume for containing a material, wherein the soil box comprises a top opening for accepting a gas treatment input, wherein the soil box comprises a gas treatment output
2900

Forming one or more gas treatment inlets in the soil box, wherein the gas treatment inlets are disposed between the gas treatment input and the gas treatment output so that a distance from the gas treatment input and the gas treatment output is less than a condensation distance
2910

Fig. 29A

Loading contaminated soil into a soil box, wherein the soil box comprises a top opening for accepting a gas treatment input, wherein the soil box comprises a gas treatment output, wherein the soil box comprises one or more gas treatment inlets, wherein the gas treatment inlets are disposed between the gas treatment input and the gas treatment output so that a distance from the gas treatment input and the gas treatment output is less than a condensation distance
2930

Bringing the loaded soil box to a treatment chamber for treatment
2940

Fig. 29B

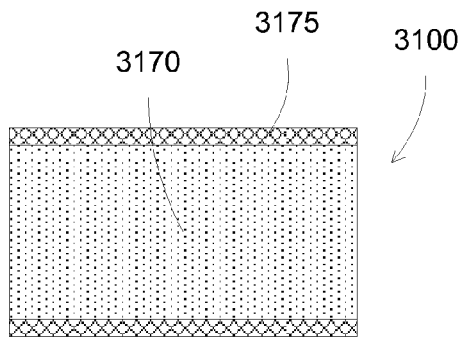 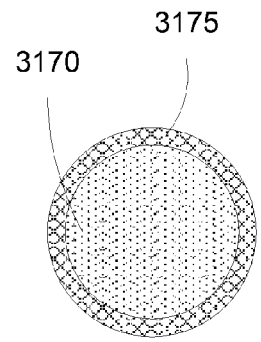
Fig. 31A  Fig. 31B
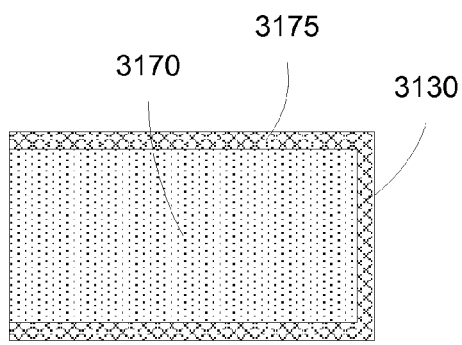 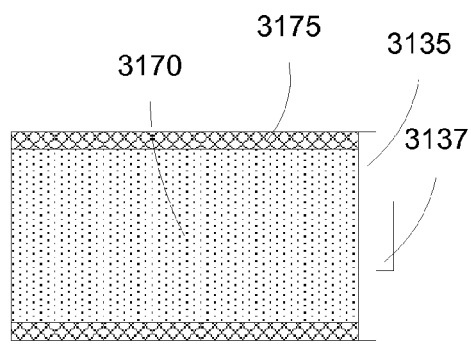
Fig. 31C  Fig. 31D
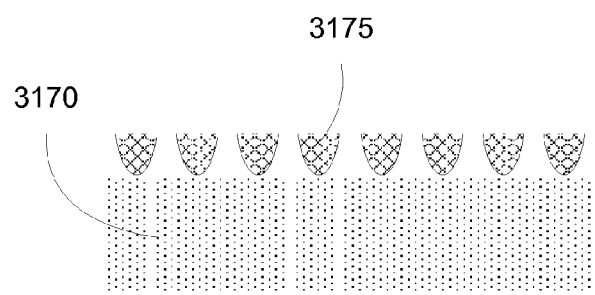
Fig. 31E Providing a soil box, wherein the soil box comprises an inner volume for containing a material, wherein the soil box comprises an opening input, wherein the soil box comprises a screen output
3400

Filling the screen output with a porous material
3410

Fig. 34A

Loading contaminated soil into a soil box, wherein the soil box comprises a top opening for accepting a gas treatment input, wherein the soil box comprises a gas treatment output, wherein the soil box comprises one or more gas treatment inlets, wherein the gas treatment inlets are disposed between the gas treatment input and the gas treatment output so that a distance from the gas treatment input and the gas treatment output is less than a condensation distance
3430

Bringing the loaded soil box to a treatment chamber for treatment
3440

Fig. 34B

Forming a treatment chamber, wherein the treatment chamber is configured to accept a soil box, wherein the soil box comprises a soil box outlet, wherein the treatment comprises an exhaust outlet to be mated to the soil box output
4100

Forming a pedestal support on an inner side of the exhaust outlet for sealing with the soil box outlet
4110

Fig. 41A

Loading contaminated soil into a soil box, wherein the soil box comprises a soil box outlet
4130

Bringing the loaded soil box to a treatment chamber, wherein the soil box outlet is mated with an exhaust outlet of the treatment chamber through a pedestal support for sealing
4140

Fig. 41B

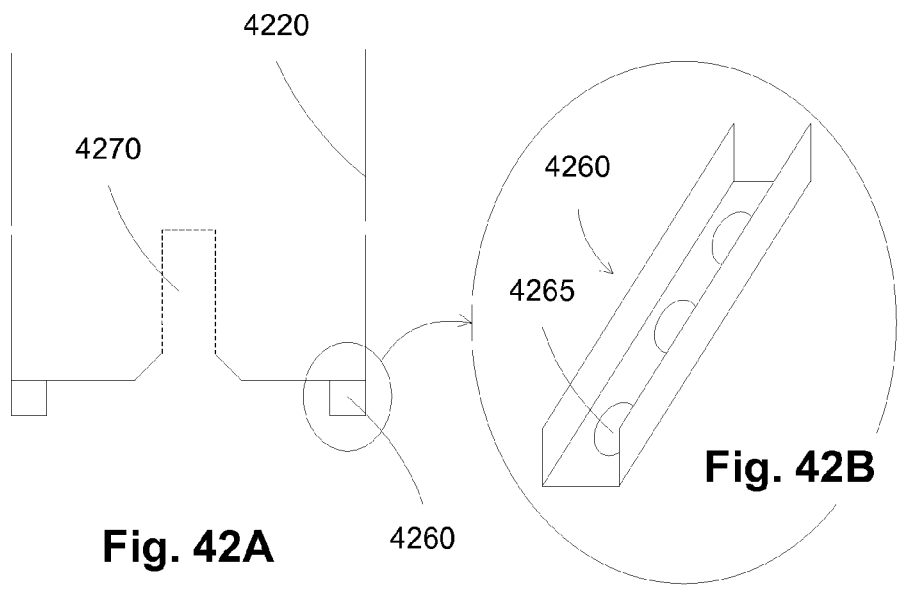
Fig. 42A  Fig. 42B
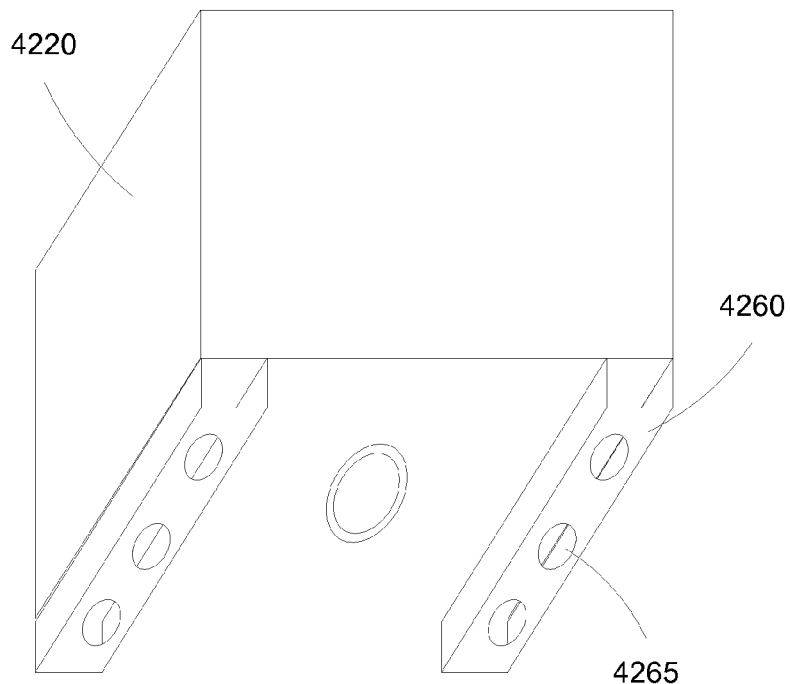
Fig. 42C

SOIL BOX FOR EVAPORATIVE DESORPTION PROCESS

This application claims priority from U.S. Provisional Patent Application Ser. No. 61/817,304, filed on Apr. 29, 2013, entitled "Soil box for evaporative desorption process"; U.S. Provisional Patent Application Ser. No. 61/840,474, filed on Jun. 28, 2013, entitled "Soil box for evaporative desorption process" and U.S. Provisional Patent Application Ser. No. 61/878,610, filed on Sep. 17, 2013, entitled "Soil box with warning towers", all of which are incorporated herein by reference.

BACKGROUND

The use of petroleum hydrocarbons as a fuel source is ubiquitous in society. Consequently, petroleum hydrocarbon products are stored and handled in great quantities. One risk associated with the storage and handling of petroleum hydrocarbons is the potential for spillages during handling or the potential for leakage during storage. Due to the negative environmental impact associated with spills and leakages of petroleum hydrocarbons, rules have been established at the local, state and federal levels. These rules primarily focus on preventing petroleum hydrocarbon releases to the environment from occurring. These rules also have provisions that require the responsible party to remediate petroleum hydrocarbon releases to the environment. In addition, industry produces hazardous waste that requires treatment prior to landfill disposal to meet land disposal restrictions. For example, gravity separated solids generated at an oil refinery require treatment to universal treatment standards prior to land disposal.

In the field of petroleum hydrocarbon remediation from soil, there are two basic approaches: applying a treatment technique to soil in place (in-situ), or applying a treatment technique to excavated soil (ex-situ). There are advantages and disadvantages for each approach and the selection of the approach is based on the site-specific circumstances of each petroleum hydrocarbon release.

Ex-situ thermal desorption technologies can include techniques that involve mechanical agitation of the soil during the heating process, which involve mechanical agitation and operate in a continuous process where the soil is continuously introduced to the process and is mechanically moved through the process apparatus until treatment is complete, and then is continuously discharged to a container for disposal or re-use.

Alternately, the soil can be treated in a static configuration, in which a given amount of soil is introduced to the treatment chamber. The soil configurations can include pile arrangement and container arrangements.

Nearly all the prior art processes use combustion of fossil fuel as a heat source. This can have the undesirable consequence of forming products of incomplete combustion, oxides of nitrogen, and other greenhouse gases as a by-product. Combustion also has the potential to add unburned hydrocarbons to the process exhaust gas if strict control of the combustion process is not maintained.

There is a need for an ex-situ static process that is labor, time and energy efficient in the treatment process, and is environmentally friendly.

SUMMARY

In some embodiments, systems and methods to treat contaminated soil are provided, including soil box designs with ease of operation and improved decontamination efficiency and throughput. Simple flow path with minimum turns for the vapor extraction flow paths, such as a large diameter vapor extraction trunk or multiple large diameter vapor extraction well screens positioned in a bottom or middle section of the soil box, can provide maximum air flow with minimal head loss. Condensation reduction soil box designs can reduce treatment time, for example, through heating the center of the soil box to reduce condensation within the core of the soil bed or through heating the lower portions of the soil box to reduce temperature stratification. Pedestal connection with self sealing feature can eliminate the need for physical connection of the soil box with the external vapor extraction processing line.

In some embodiments, systems and methods to optimize dry distillation flow of soil box are provided. Hot air vapor extraction arrangement can include large diameter vertical or horizontal trunk line with continuous wire wrap well screens. The center vapor extraction trunk can draw all vapors to the center of the soil box, which can reduce the treatment time by substantially removing condensation zone. The interior of the vapor extraction well screen and trunk can include porous material, which can reduce dust within the vapor stream, eliminate potential short circuiting in the event of a screen rupture and reduce potential explosion hazards.

In some embodiments, systems and methods to optimize supplied hot air flow are provided. Hot air supplied can be provided from 5 sides of the soil box to create multiple dry distillation fronts moving toward the hot air vapor extraction arrangement. A hot air cradle can be used to provide hot air to the surrounding sides of the soil box, for example, through narrow slits in the cradle. Further, the cradle can be configured to align the soil box in the treatment chamber.

In some embodiments, systems and methods to connect the removable soil box with the vapor treatment arrangement are provided. A seal at the bottom of the soil box can provide an automatic pedestal connection when the soil box is placed into the treatment chamber. The weight of the full soil box can exert enough force to maintain the seal between the soil box and the vapor treatment arrangement.

BRIEF DESCRIPTION OF THE DRAWINGS

FIGS. 4A-4D illustrate exhaust screens according to some embodiments.

FIGS. 10A-10B illustrate flow charts for forming soil boxes to be used in a thermal desorption system according to some embodiments.

FIGS. 13A-13G illustrate examples of a soil box according to some embodiments.

FIGS. 16A-16D illustrate some soil box configurations to reduce treatment time according to some embodiments.

FIGS. 19A-19B illustrate flow charts for generating uniform heating profiles according to some embodiments.

FIGS. 20A-20C illustrate a gas delivery configuration for a soil box according to some embodiments.

FIGS. 21A-21D illustrate other gas delivery configurations for a soil box according to some embodiments.

FIGS. 23A-23B illustrate flow charts for forming cradle for a soil box according to some embodiments.

FIGS. 26A-26F illustrate other examples of a soil box according to some embodiments.

FIGS. 29A-29B illustrate flow charts for thermal desorption processes with minimized condensation contaminants according to some embodiments.

FIGS. 31A-31E illustrate an example of a well screen portion for a vapor extraction line according to some embodiments.

FIGS. 34A-34B illustrate flow charts for soil box having porous materials in vapor extraction line according to some embodiments.

FIGS. 41A-41B illustrate flow charts for thermal desorption processes having pedestal supports according to some embodiments.

FIGS. 42A-42C illustrate an example of a soil box having handles according to some embodiments.

DETAILED DESCRIPTION

Figure 1:
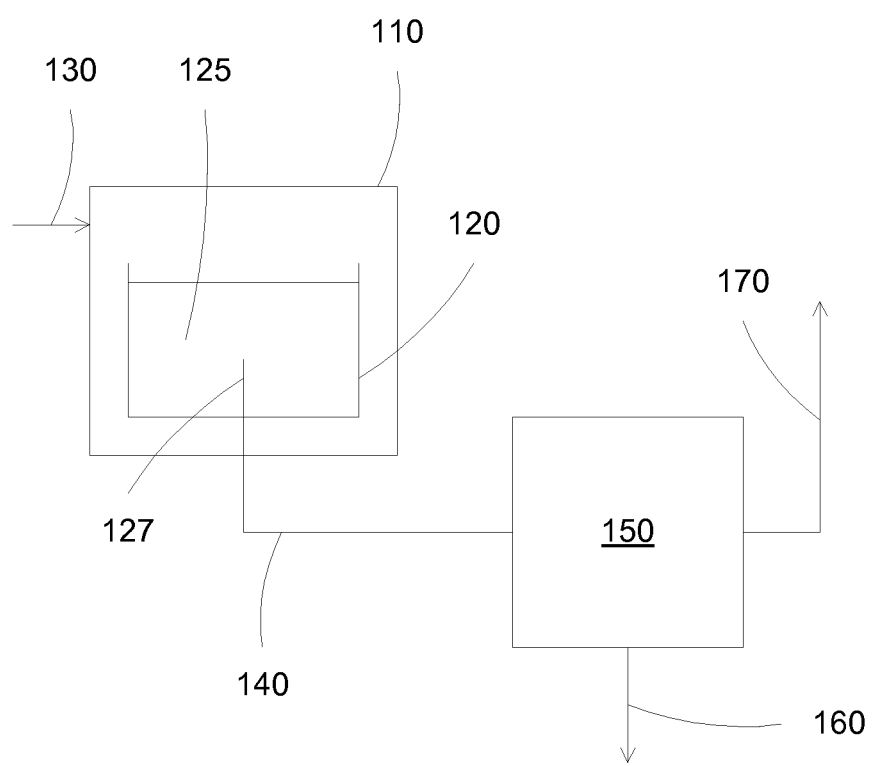
FIG. 1 illustrates a schematic evaporative desorption system according to some embodiments.

In some embodiments, the invention relates to a process and apparatus for non-combustive thermal desorption of volatile contaminates from contaminated earth. The earth may include tar sand, oil sand, oil shale, bitumen, pond sediment, and tank bottom sediment. The concentration of the contaminates can be low concentration, e.g., less than about 3%, or high concentration, e.g., greater than about 3%. The process can provide cracking of the contaminates, and/or reclaiming condensable contaminates, then oxidizing and treating the non-condensable reclamation effluent, which can be recycled for use as the thermal desorption treatment gas either directly or through heat exchangers.

The non-combustive thermal desorption of volatile contaminates from low concentration contaminated earth is described in U.S. Pat. No. 6,829,844 (Brady et al) which is incorporated herein by reference in its entirety. The thermal desorption is intended to remove organic contamination from porous media such as soil, rock, clays or other porous media with low organic contamination (less than 3% organic contamination) where desiccated electrically heated atmospheric air is used as the primary treatment gas.

In some embodiments, the present invention, an evaporative desorption and/or reclamation process for high organic concentration situations, can be cost effectively constructed to any scale and can exceed the 10 ton per hour production rate of indirect rotary kilns. The method can rely on hot air moving through a static volume of porous media. No mixing mechanisms for the porous media are required for treatment. In addition the process can recycle its heated treatment gas supply, minimizing energy required for treatment.

In some embodiments, the invention relates to a process and apparatus for thermal desorption of contaminates from a mixture of soil and rocks using desiccated, non-combustion-heated fresh treatment gas, such as air, to treat the soil and rocks which have been excavated and placed in a thermally conductive treatment container which is then placed in a thermally insulated treatment chamber. The fresh, hot, desiccated air is drawn through the soil treatment container, cooled, and released; or discharged to a treatment system, as required or needed, prior to release to the atmosphere.

In some embodiments, a thermal desorption technique applied to a static configuration of contaminated soil using a container arrangement is provided. The thermal desorption technique can restore the soil to its un-contaminated condition by removing the contamination within the soil through the evaporative desorption process. To provide an efficient remediation process, different temperature settings can be used to treat different contaminated soil, and thus sample of the contaminated soil can be tested to determine appropriate treatment conditions.

In some embodiments, systems and methods to treat contaminated soil are provided, including soil box designs with ease of operation and improved decontamination efficiency and throughput. Simple flow path with minimum turns for the vapor extraction flow paths, such as large diameter vapor extraction trunks positioned at a bottom section of the soil box, can provide maximum air flow with minimal head loss. Condensation reduction soil box designs can reduce treatment time, for example, through heating the center of the soil box to reduce condensation within the core of the soil bed or through heating the lower portions of the soil box to reduce temperature stratification. Pedestal connection with self sealing feature can eliminate the need for physical connection of the soil box with the external vapor extraction processing line.

In some embodiments, systems and methods are provided to supply thermal desorption of high-concentration hydrocarbon contaminants from excavated soil, such as tar sand, oil sand, oil shale, bitumen, pond sediment, and tank bottom sediment. The systems can provide efficient contaminant removal by handling the soil in a thermally conductive soil box that fits within an insulated treatment chamber. The soil is treated in this chamber with hot dry treatment gas. The contaminates can be reclaimed from the soil box. A portion of the contaminates, such a non-condensable hydrocarbon contaminates, can be used for effluent conditioning, for example, to maintain a desired treatment gas temperature in the soil box.

Contaminated earth (soil and rocks or other earthy material) that has been excavated is placed in a thermally conductive soil box which is then placed in a thermally insulated treatment chamber. Heated treatment gases can be introduced to the soil box and flow through the soil box and the contaminated earth. Hot gas extraction, e.g., treatment gases containing contaminates, can be withdrawn from the treatment chamber. The process is continued until the contaminates are completely removed from the soil, e.g., below a desired contamination level.

In some embodiments, the contaminates can be reclaimed from the hot gas extraction, for example, through a heat exchanger to cool and separate the condensable contaminates. The static soil arrangement and filtered vapor extraction well screens provide a dust free vapor, which eliminates sludge generation during contaminant condensation. The remaining hot gas extraction can be treated in a combustion or electrically heated thermal oxidizer, for example, to remove non-condensable contaminates. The heat exchangers can be set in such a way to fuel the thermal oxidizer thus reducing external fuel/electrical power consumption. The output from the thermal oxidizer can be partially recycled to the treatment chamber as the treatment gas, or to maintain the temperature of the treatment chamber.

The soil box can have sides to contain the contaminated soil. For example, the soil box can be an open top rectangular cube, prism or cylinder. The corners of the box can be rounded to facilitate even vapor flow and material dumping. The soil box can also have a gas exit pathway within the contaminated soil so that gases in the contaminated soil flow to the gas exit pathway.

The treatment chamber can have an opening so the soil box may be inserted or removed, a gas inlet to receive hot dry gas, which can be directed to the soil box, and a gas outlet arranged to be mated with the gas exit pathway of the soil box so the gases in the contaminated soil exit the treatment chamber.

A heater and drier assembly can be arranged so that the incoming treatment gas to the treatment chamber is dried and heated upon entering the treatment chamber. A blower assembly can be arranged to direct the hot gas extraction from the soil box to exit the treatment chamber.

Dry, heated incoming treatment gas can be provided to the soil box, for example, to the opening of the soil box and/or to the sides of the soil box, to transferring heat to the contaminated soil, inducing the migration of contaminates through the soil to the gas exit pathway. The heated treatment gas flows through the contaminated soil, directly heating the soil before entering the gas exit pathway and exiting the chamber, carrying the contaminates.

FIG. 1 illustrates a schematic evaporative desorption system according to some embodiments. One or more soil boxes 120 can be placed in a treatment chamber 110. The treatment chamber can be insulated to prevent heat loss. The soil boxes can be open on top and contain a gas exit pathway 127. The soil boxes, after filled with contaminated soil 125, can be installed in the treatment chamber 110 for contamination treatment, and can be removed after the contamination treatment is complete. The soil boxes can provide for a batch process for contaminated soil and clean soil. Hot and dry treatment gas 130 can be introduced to the treatment chamber 110. The treatment gas can pass through the contaminated soil in the soil box to the gas exit pathway 127 coupled to the treatment chamber exhaust 140, and then flow out of the treatment chamber 110.

The exhausted treatment gas can contain hydrocarbon contaminates, which can be recovered. A recovering assembly 150 can be coupled to the treatment chamber exhaust 140 to recover all or a portion of the hydrocarbons in the exhaust treatment gas. The recovering assembly 150 can include one or more heat exchangers and a gas extraction fan, which provides the flow of treatment gas from the treatment chamber 110 through the heat exchangers. The contaminates can be condensed and flow to a phase separator to recover the condensate from heat exchangers. Heavy organics, light organics, and water can be separated in the phase separator and flow 160 through the outlets to collection tanks. Remaining residues can be exhausted 170 to a vent stack.

Figure 2:
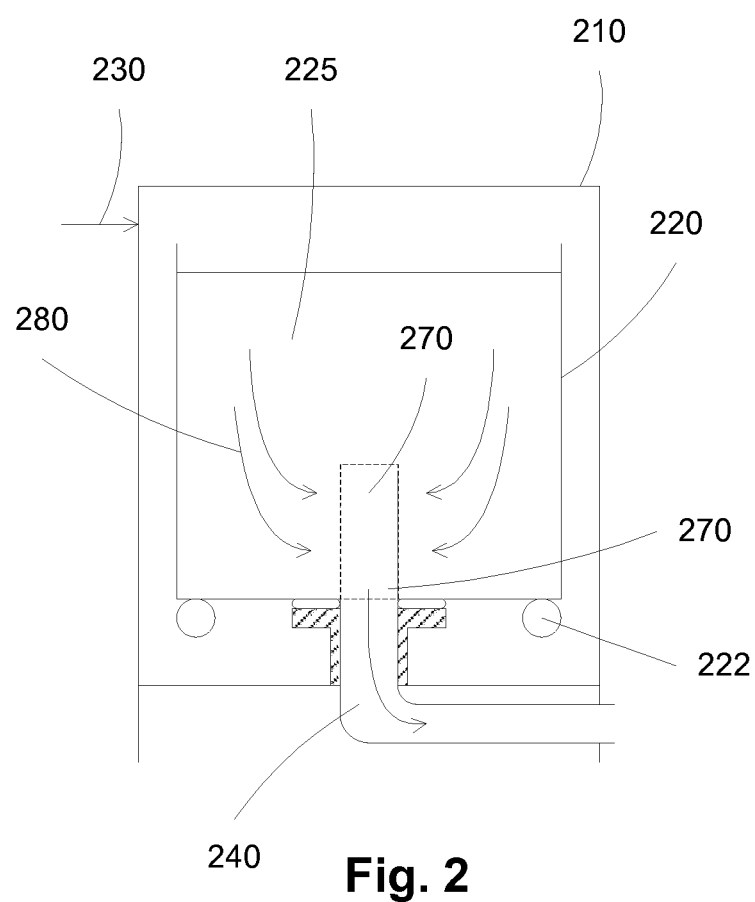
FIG. 2 illustrates a soil box positioned in a treatment chamber according to some embodiments.

FIG. 2 illustrates a soil box positioned in a treatment chamber according to some embodiments. The soil box 220 is a removable, sometimes called a roll-off, hopper modified to contain the gas exit pathway 270. The open-top soil box 220 can be supported by rollers 222 or steel rails (not shown) in the bottom. The treatment chamber 210 can accept a hot and dry treatment gas 230, such as desiccated air. The treatment gas can enter the soil 225, flow 280 toward the gas exit pathway 270, carrying away the contaminants within the soil. The treatment chamber 210 can be thermal insulated. The soil box 220 contains a gas exit pathway 270 located near the bottom of the soil box. The gas exit pathway can be perforated to allow flow of treatment gas from the surrounding soil into the pathway. The soil box 220 can be installed on a pedestal soil box support that provides a flow path from the soil box gas exit pathway 270 to provide for treatment gas and contaminants from the treatment chamber to exit 240 the chamber.

The soil box generally is the thermally conductive vessel used to contain and treat contaminated soil inside the EDU treatment chamber. The soil box can be constructed with vapor extraction lines at the bottom of the soil box. The soil 225 contained within the soil box presents the largest frictional head loss through the entire treatment gas flow path.

In some embodiments, the present invention discloses a soil box for the thermal desorption process. The soil box is configured to provide an improved thermal desorption process, such as higher throughput, faster removal of contaminants, and lower power consumption.

In some embodiments, the soil box is configured so that the thermal energy can travel uniformly from the heating inlet to the exhaust outlet. Different thermal paths from the heating inlet to the exhaust outlet can be similar, e.g., having the same distance and/or thermal gradient. This can allow uniform treatment of the soil, e.g., the contaminated soil material in the soil box can be treated uniformly in different thermal paths, so that the contaminated soil can finish the treatment at a same time. The uniform thermal treatment can eliminate or reduce dead spots or spots with longer heat treatment.

In some embodiments, the present invention discloses a screen element, which can be disposed at a bottom side of the soil box so that the hot treatment gas can provide uniform thermal paths through the soil material. Since the soil can have a horizontal soil surface in the soil box, the screen element can be placed substantially parallel to the soil surface, which can be parallel to the bottom side of the soil box. The screen element can include a screen attached to a soil box, substantially parallel and space apart from the bottom side.

Figure 3A:
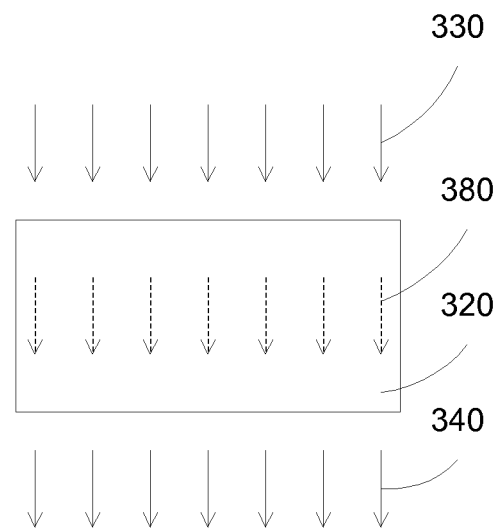
FIGS. 3A-3B illustrate a uniform thermal treatment of a soil box according to some embodiments.
Figure 3B:
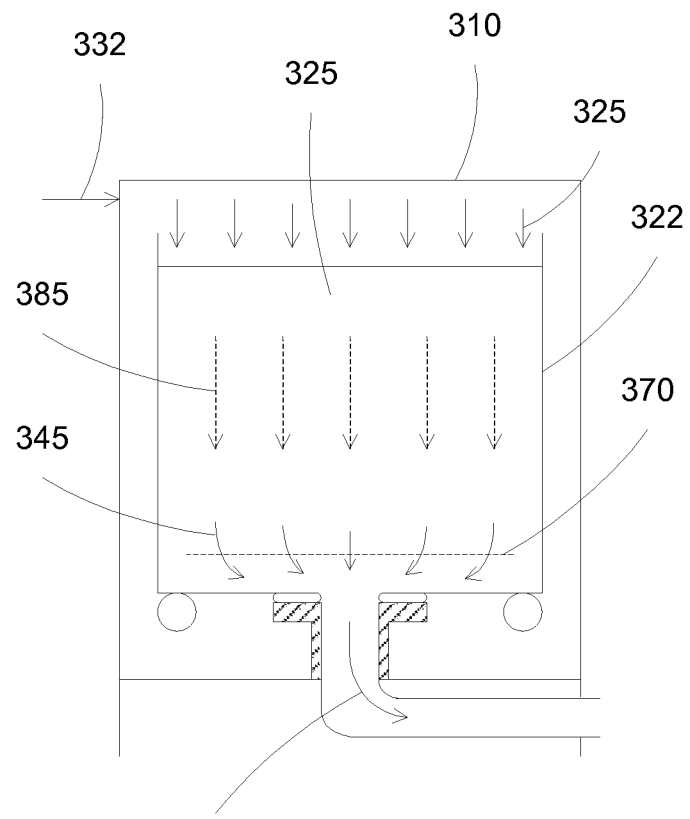

FIGS. 3A-3B illustrate a uniform thermal treatment of a soil box according to some embodiments. The soil box is configured so that there are uniform heat paths from the input to the exhaust. Heat paths generated from the heat input and terminated at the heat output are all substantially similar, allowing a shortest treating time of the soil.

FIG. 3A shows a schematic heating of a soil box that can provide uniform thermal treatment. Heat input 330 can be provided to a soil material 320. The soil material 320 can be configured, through the configuration of the heat output 340, so that the thermal paths 380 from the heat input 320 to the heat output 340 are all substantially uniform. The uniformity of heat paths can provide an improved thermal desorption treatment of the contaminated soil, for example, to allow the soil to complete the treatment at a same time, e.g., there is no section of the soil that need to be treated longer. As shown, at the beginning, the heat input 330 is applied to the top portion of the soil 320. The top portion of the soil is treated, e.g., contamination evaporated and removed from the soil. The heat wave then travels downward to the next portions of the soil, treating these portions. When the heat wave reaches the bottom of the soil, all soil has been treated. This heating process can represent an optimum time treatment, e.g., ensuring all soil is treated at the end of the treatment process at a shortest time possible.

The soil box configuration can include a bottom exhaust that is similar to the top input. For example, the soil box can have an open top, which is configured for ease of receiving and removal of contaminated soil material. The open top can be operable as a thermal inlet, accepting hot gas, such as from a heat source, for treating the contaminated soil. The bottom of the soil box can be configured as an exhaust output, thus allowing heat paths to run parallel from the top side to the bottom side of the soil box.

In some embodiments, the flow conductance through the exhaust output can be substantially similar to the flow conductance through the soil. A hot gas can be provided to the top portion of the soil box, and then the hot gas can travel through the soil to reach the exhaust outlet. There is a flow conductance through the soil, e.g., the soil represents a resistance to the hot gas flow. The exhaust output can have a flow conductance, for example, determined by the opening of the outlet. In some embodiments, the exhaust output can be configured in the form of a screen, with small openings for support the soil, e.g., preventing the soil from entering the exhaust outlet, and for allowing the hot gas to exhaust. The screen can have a mesh size, e.g., screen opening or open area, that is compatible, e.g., similar, to the conductance through the soil, thus allowing the hot gas to travel through the soil to the exhaust with efficiency.

FIG. 3B shows a soil box positioned in a treatment chamber according to some embodiments. The soil box 322 is a removable container having a gas exit pathway 375 located near the bottom of the soil box. The soil box 322 can have an open top, and is disposed in a treatment chamber 310. The treatment chamber 310 can accept a hot treatment gas 332, such as desiccated air. The treatment gas can enter the soil 325, flow 385 toward the gas exit pathway 375, carrying away the contaminants within the soil.

A screen 370 can be placed at a bottom side of the soil box, such as substantially parallel to the bottom side. The screen can be perforated at a desired mesh size to allow flow of treatment gas from the surrounding soil into the pathway. The mesh size can be selected to have similar flow conductance as the soil, so that the treatment gas can flow through the soil, passing the screen to the gas exit pathway 375.

The hot gas 332 can enter the treatment chamber 310, and contact the top surface of the soil, for example, in a direction 325 facing the soil surface. With the screen 370 arranged in parallel to the soil surface, the hot gas 332, through flowing direction 325, can travel in a parallel direction 385 toward the screen 370. After passing through the screen, the treatment gas can be exhausted 345 toward the gas exit 375.

The screen can be configured to be parallel to the top soil surface, for example, to provide a uniform flow through the soil from the top soil surface. In general, the soil box can have flat bottom surface, which is parallel to the top soil surface. Thus the screen can be placed substantially parallel to the bottom side of the soil box. In some embodiments, the soil box can have a bottom that is non-flat or non-parallel to the top soil surface. The screen can be configured to be parallel to the top soil surface, regardless of the bottom side configuration.

FIGS. 4A-4D illustrate exhaust screens according to some embodiments. A screen 470 or 471 can be placed at a bottom portion of the soil box 420. The screen 470 can be substantially parallel to the top soil surface, e.g., to a horizontal surface. The soil box can have a non horizontal bottom surface. In some embodiments, the screen 471 can be concave up, for example, to improve the structural stability for supporting the soil and to increase the flow conductance by having a larger area. For example, a concave up screen can have about 5-20% higher area, e.g., flow conductance, as compared to a flat screen. The screen can cover an exhaust outlet 440, forming an area without soil material, from the screen 470/471 toward the exhaust outlet 440. Thus soil material can be placed in the soil box, above the screen, with the screen having a mesh size that does not allow soil material to pass through, but can allow the treatment gas to pass through. In addition, the mesh size of the screen can have conductance, e.g., based on the mesh size, that is similar to the flow conductance through the soil.

In some embodiments, the screen element can include one or more screen tubes, placed parallel to the bottom side of the container, or to the top soil surface.

Figure 5A:
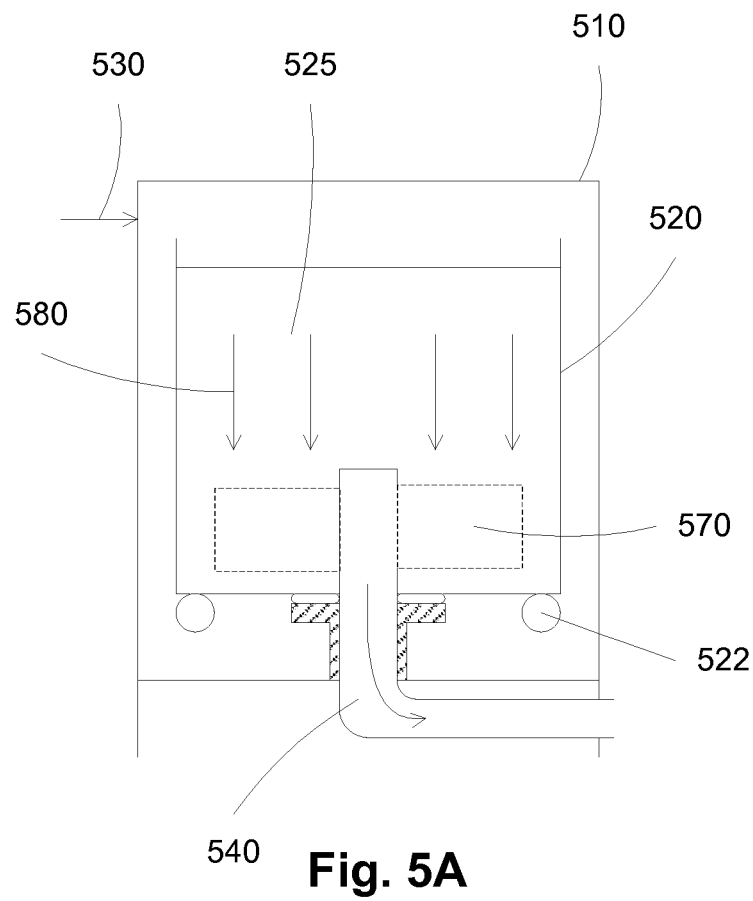
FIGS. 5A-5C illustrate a uniform thermal treatment of a soil box according to some embodiments.
Figures 5B, 5C:
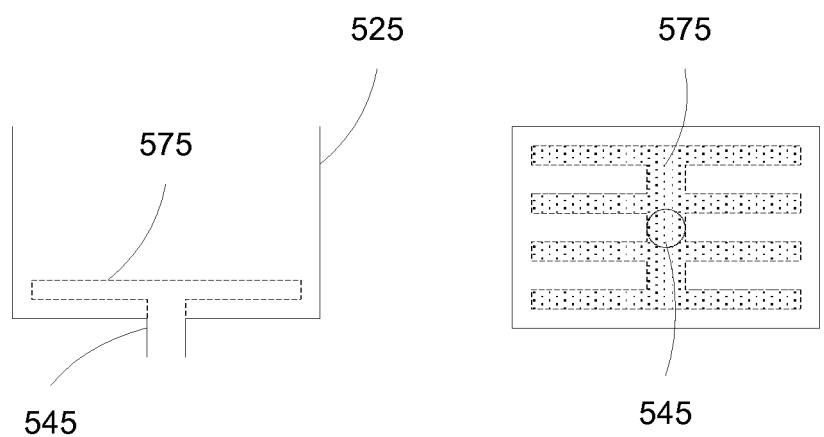

FIGS. 5A-5C illustrate a uniform thermal treatment of a soil box according to some embodiments. The screen element 575 can include hollow tubes 545 placed at a bottom side of the soil box, to form uniform heat paths from the top soil surface to the exhaust. The soil box 520 is a removable container having a gas exit pathway 540 located near the bottom of the soil box. The soil box 520 can have an open top supported by rollers 522, and is disposed in a treatment chamber 510. The treatment chamber 510 can accept a hot treatment gas 530. The treatment gas can enter the soil, flow 580 toward the gas exit pathway 540, carrying away the contaminants within the soil.

A screen 570 can be placed at a bottom side of the soil box, such as substantially parallel to the bottom side. The screen can be perforated at a desired mesh size to allow flow of treatment gas from the surrounding soil into the pathway. The mesh size can be selected to have similar flow conductance as the soil, so that the treatment gas can flow through the soil, passing the screen to the gas exit pathway 540.

The hot gas 530 can enter the treatment chamber 510, and contact the top surface of the soil 525, for example, in a direction facing the soil surface. With the screen 570 arranged in parallel to the soil surface, the hot gas 530 can travel in a parallel direction 580 toward the screen 570. After passing through the screen, the treatment gas can be exhausted toward the gas exit 540.

In some embodiments, the screen can have stainless steel continuous slot wire wrap well screen to provide the maximum open area for vapor flow. The well screen also can be double wall with thermally resistant filter media such as steel wool or well pack sand. The well screen can also be single wall that contains a porous filter media.

In some embodiments, the screen and vapor flow path can require a simple flow path without unnecessary turns to improve the flow efficiency. The screen design can include a large diameter vapor extraction trunk with smaller continuous slot wire wrap well screens. The small well screens can be double walled with thermally resistant packing material in the annulus. The small screens can offer more open area for vapor flow and eliminate unnecessary turns in the vapor flow path. The center vapor extraction trunk draws all vapors to the center of the soil box. Condensation zones can be reduced or eliminated.

Figure 6A:
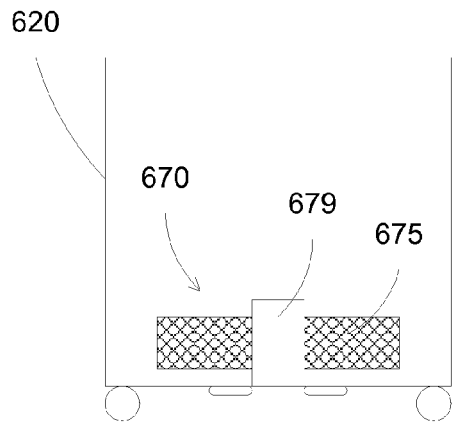
FIGS. 6A-6C illustrate an example of a soil box according to some embodiments.
Figure 6C:
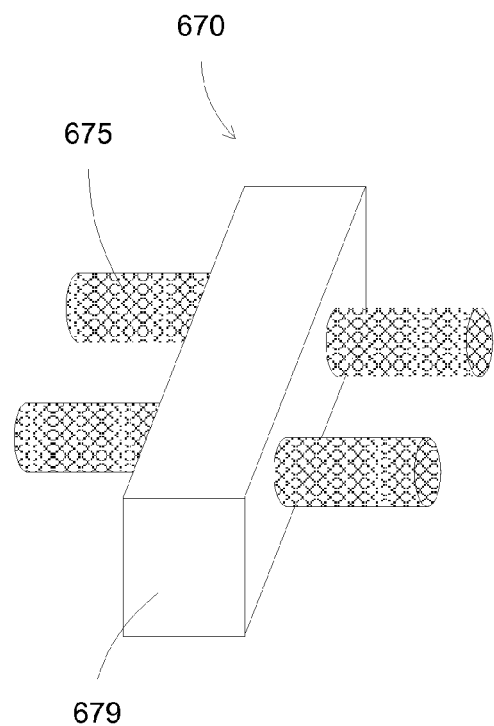
Figure 6B:
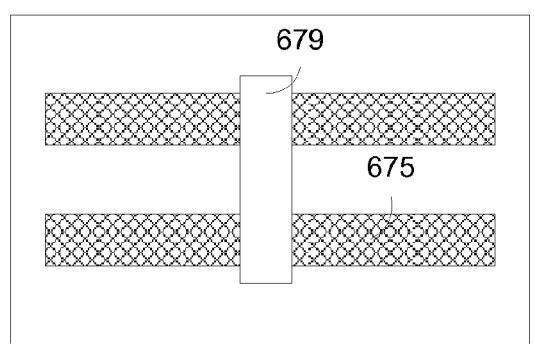

FIGS. 6A-6C illustrate an example of a soil box according to some embodiments. The soil box 620 can include a vapor extract line 670 disposed in a bottom section of the soil box. As shown, the vapor extract line 670 includes cylindrical conduits 675, but other cross sections can be used, such as square or rectangular. The conduits 675 can be coupled to a middle box 679 in an H configuration. The dimension of the vapor extraction line, e.g., the diameter of the cylindrical conduit, can be between 5 and 60 cm, such as 10 inch screen. The length of the vapor extraction line can be related to the soil box dimension, such as between 70 to 90 or 95% of the size of the soil box. The height of the vapor extraction line can be less than about 60 cm, such as between about 20 to 60 cm, or can be related to the soil box dimension, such as less than a quarter of the height of the soil box.

The vapor extract line 670 can have screen openings for receiving the treatment gas to release to the outside of the soil box. The screen openings can be disposed around the vapor extraction line 670. In some embodiments, the screen openings can also be positioned at the top of the vapor extraction line. The length of the well screen openings can be short, for example, less than about 10 or 5 cm. The well screen openings can be smaller than the diameter of the trunk, for example, between 1 and 10 cm. The screen can allow gas to escape and blocking the soil from falling out of the soil box. The screen size, e.g., the porosity of the screen or the ratio of the non-blocking portion of the screen, can be between 10 and 90%. The well screens can include continuous-slot (wire wrap) screens of a triangular-shaped wire wrapped around an array of rods. The well screens can have as large a percentage of non-clogging slots as possible to ease the escape of the treatment gas. The well screens can be resistant to corrosion, have sufficient strength to resist collapse, and prevent sand pumping.

FIGS. 7A-7D illustrate other examples of a soil box according to some embodiments. The soil box 720 can include a vapor extract line 770/760 disposed at a bottom section of the soil box. The diameter of the vapor extract line can be between 5 and 20 inches, such as 5 and 15 inches or about 10 inches. The vapor extract line can have screen openings 775 for receiving the treatment gas to release to the outside of the soil box. The screen openings 775 can be disposed around the vapor extraction line and consist of a double wall pre-pack well screen with thermally stable filter media in the annulus. The well screen slot may be continuous. The middle portion 779 of the vapor extraction line can be a solid plate, for example, to prevent soil from falling to the exit line. In some embodiments, top portion 779 of the vapor extraction line can include screen openings.

Figure 7A:
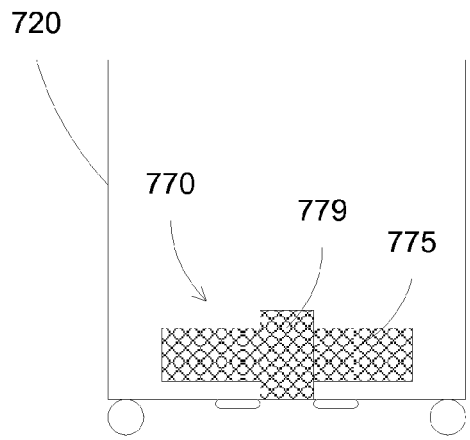
FIGS. 7A-7D illustrate other examples of a soil box according to some embodiments.
Figure 7C:
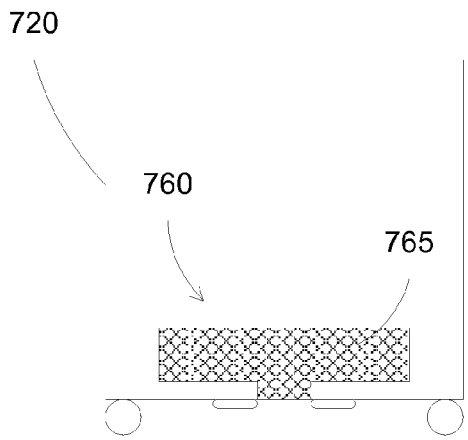
Figure 7B:
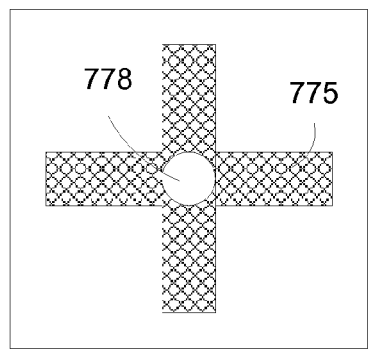
Figure 7D:
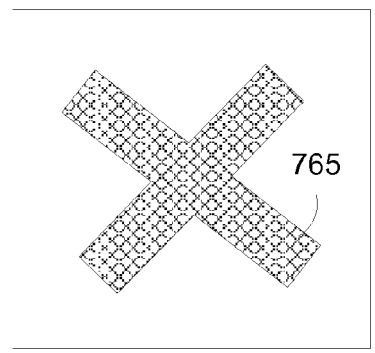

FIGS. 7A-7B show a vapor extract line 770 with middle portion 779 and cylindrical rods 775 having screen openings. In some embodiments, side 778 of the vapor extraction line 770 can include solid plate. FIGS. 7C-7D show a vapor extract line 760 with one portion 765 having screen openings.

Figure 8:
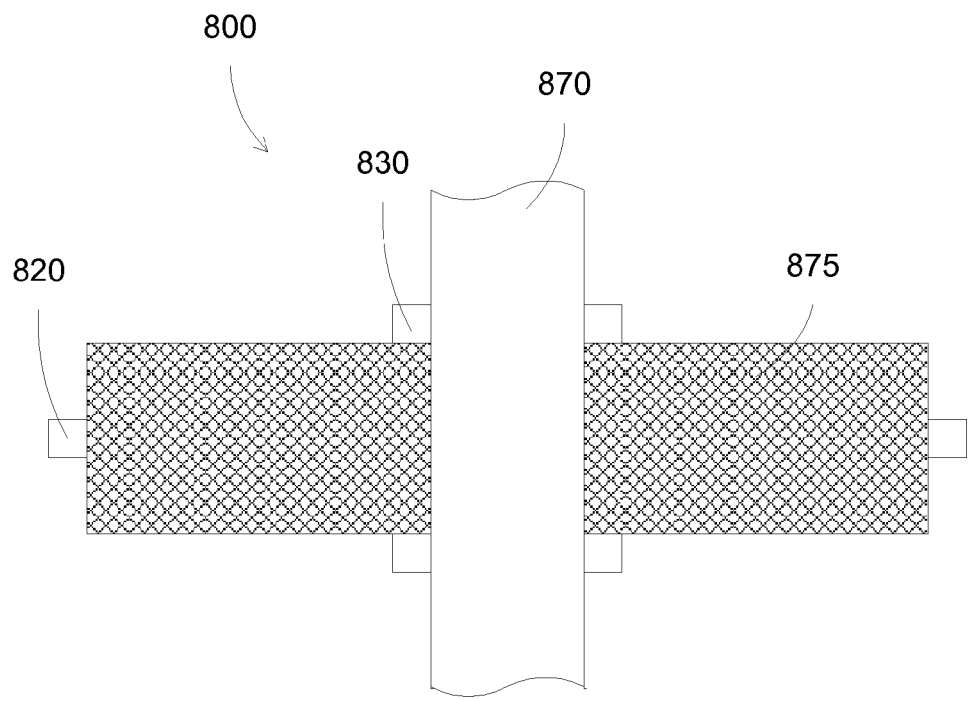
FIG. 8 illustrates an example of a vapor extraction line according to some embodiments.

FIG. 8 illustrates an example of a vapor extraction line according to some embodiments. The vapor extract line 800 can be disposed in the middle of the soil box, including a middle portion 870 and cylindrical portions 875. The middle portion 870 of the vapor extraction line 800 can be a solid plate. The cylindrical portions 875 can have well screen. The screen section 875 consists of a double wall pre-pack well screen with thermally stable filter media in the annulus. The well screen may be a continuous slot screen.

In some embodiments, the cylindrical portions 875 can be mated to the middle portion 870, thus allowing ease of replacement. Mating portion 830 can include locked attachment, such as twist lock to secure the cylindrical portions 875 to the middle portion 870. A top portion 820 can be included for connection with a socket or a wrench to allow secured attachment, such as screwing, the two portions 875 and 870.

In some embodiments, hot gas can be provided at corners of the soil box for evenly and uniformly heating the soil. The soil box can have non-spherical shape, such as a rectangular or cube box. The heating from outside surfaces can be inefficient due to the irregular surface configuration. Warming towers can be placed to compensate for the irregular surfaces, providing a uniform and even heating fronts to the center of the soil.

Figure 9A:
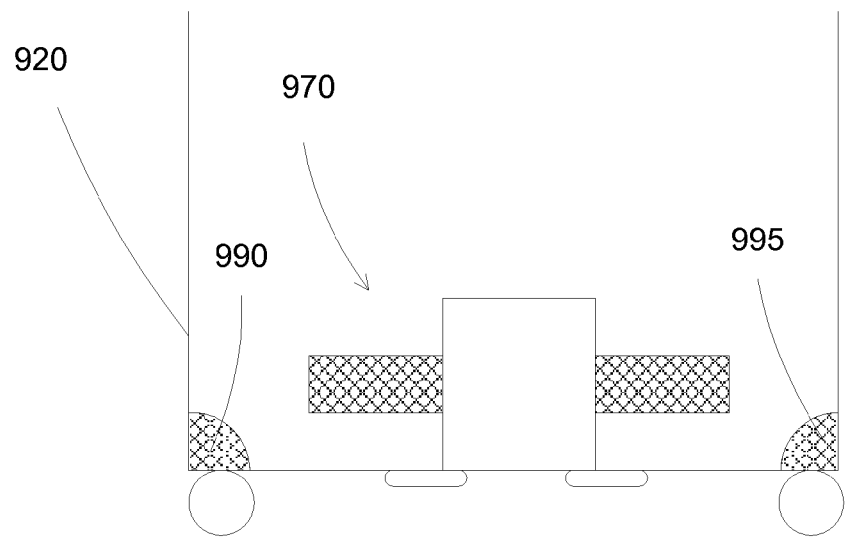
FIGS. 9A-9C illustrates configurations for improve uniform heating to the soil box according to some embodiments.
Figure 9B:
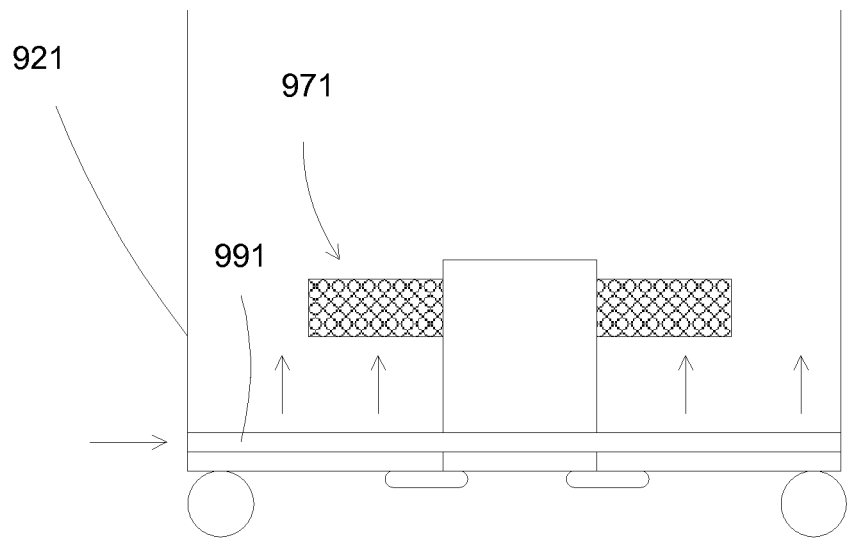
Figure 9C:
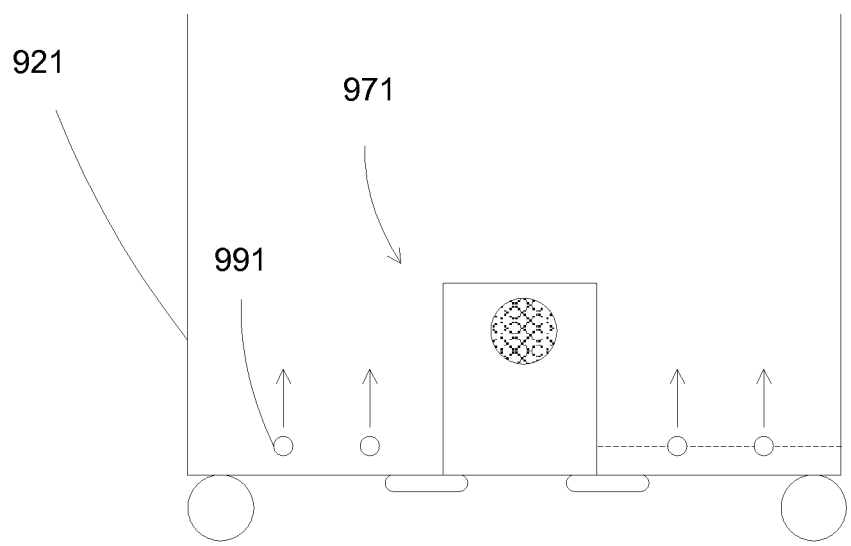

FIGS. 9A-9C illustrates configurations for improve uniform heating to the soil box according to some embodiments. In FIG. 9A, corner heating elements can be used for avoiding cold spots at corners of a soil box. The soil box 920 can include a vapor extract line 970 disposed in a bottom section of the soil box. Corner warming towers 990 and 995 can be provided at corners of the soil box to provide thermal energy to the soil, especially at areas that could take longer to be heated. Thus, in addition to a top surface heat front, corner heat fronts can assist in heating the soil toward the vapor extraction line, driving the vaporized contaminants toward the vapor extraction line to be exhausted.

In FIGS. 9B-9C, hot pipes, e.g., hollow pipes carrying hot gas, can be placed under the vapor extract line 971, for example, to assist in heating the soil at the bottom of the soil box. The soil box 921 can include a vapor extract line 971 disposed near a bottom section of the soil box. Bottom warming pipes 991 can be provided under the vapor extract line to provide thermal energy to the soil, especially at areas passed the collection points.

In some embodiments, the present invention discloses methods to fabricate thermal desorption equipment, including the soil boxes, that can offer high efficiency, e.g., low power consumption and faster process time. The soil box can be formed so that a hot gas introduced to a top soil surface can travel effectively through the soil material. For example, a screen element can be placed at a bottom side of the soil box so that the hot gas can pass uniformly through the soil to the screen element.

FIGS. 10A-10B illustrate flow charts for forming soil boxes to be used in a thermal desorption system according to some embodiments. In FIG. 10A, operation 1000 forms a soil box. The soil box can include an inner volume for containing a material, such as a contaminated soil material. The soil box can have an opening.

Operation 1010 forms an exhaust outlet for the soil box. The exhaust outlet can be configured to contain the material in the soil box. The exhaust outlet can be configured so that a gas provided to the opening forms a substantially uniform flow through the material to the exhaust outlet.

In some embodiments, the exhaust outlet and the inlet opening can have similar flow conductance. The exhaust outlet can have similar flow conductance as the soil material, e.g., there is no flow restriction from the soil material to the exhaust outlet. For example, the soil can have about 20-40% porosity, thus the exhaust outlet can be between 20-40%, such as 30% of the inlet opening, to accommodate the treatment gas. The exhaust outlet can include a screen having large screen mesh, e.g., large screen opening. The opening can be as large as possible for high flow conductance, while small enough for preventing the soil to fall through. The exhaust outlet can be configured to obtain a flow distribution that prevents dead space, or prevent areas that can have more treatment time, e.g., areas that have lower temperature or less gas flow.

In FIG. 10B, operation 1030 forms a soil box, for example, a soil box to be used in a thermal desorption system. The soil box can have an inner volume for containing a material, such as a contaminated soil material. The soil box can have a top opening. Operation 1040 forms an exhaust outlet at a bottom of the soil box. Operation 1050 forms a screen conduit coupled to the exhaust outlet. The screen conduit can be configured so that a gas provided to the top opening forms a substantially uniform flow through the material.

In some embodiments, the screen can cover all or a portion of the bottom of the soil box, such as a screen plate (flat or curve) disposed near the bottom, or one or more screen tubes near the bottom. For example, the screen can have a curve surface to support the weight of the soil material. The screen can include multiple screen conduits disposed along the bottom side to collect exhaust gas. The conduits can be substantially parallel to the soil surface. The conduits can be fluidly coupled to the exhaust outlet. For example, one side of the screen faces the material, and one side of the screen fluidly couples to the exhaust outlet. The screen can have similar conductance as the flow conductance through the soil material. For example, the screen can have large pores or high pore ratio to allow the exhaust gas to pass through.

Figure 11:
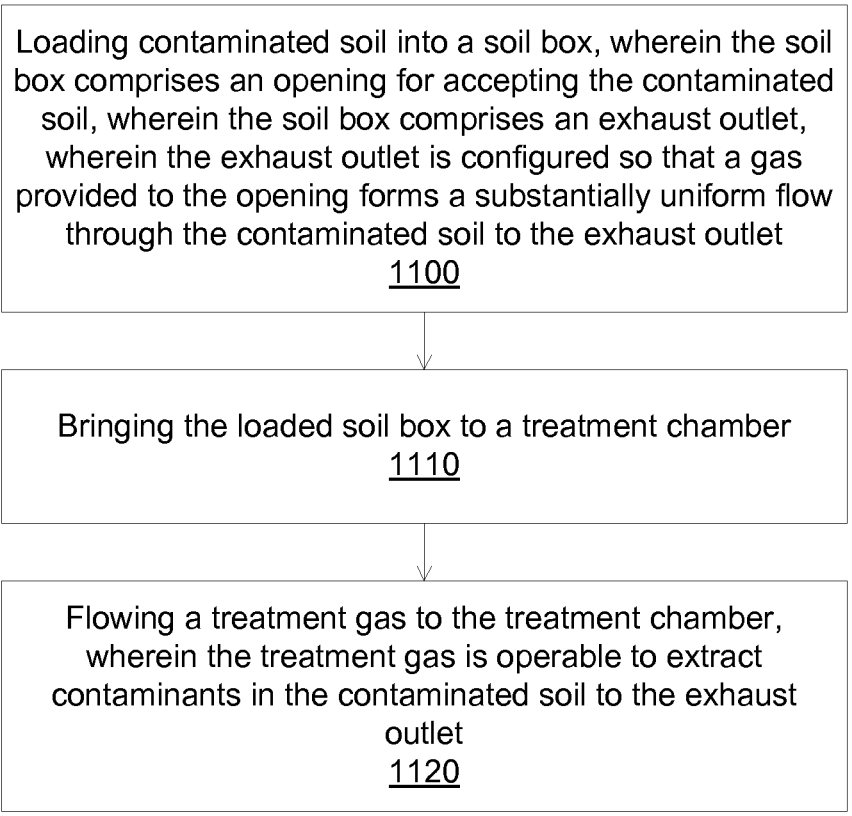
FIG. 11 illustrates a flow chart for using an improved soil box in a thermal desorption system according to some embodiments.

FIG. 11 illustrates a flow chart for using an improved soil box in a thermal desorption system according to some embodiments. Operation 1100 loads contaminated soil into a soil box, wherein the soil box comprises an opening for accepting the contaminated soil, wherein the soil box comprises an exhaust outlet, wherein the exhaust outlet is configured so that a gas provided to the opening forms a substantially uniform flow through the contaminated soil to the exhaust outlet. Operation 1110 brings the loaded soil box to a treatment chamber. Operation 1120 flows a treatment gas to the treatment chamber, wherein the treatment gas is operable to extract contaminants in the contaminated soil to the exhaust outlet.

In some embodiments, the thermal uniformity of a soil box can be improved by having heating gas flows at side walls of the soil box. For example, the soil box can be placed in a thermal desorption chamber which is configured to accept a hot gas. The soil box can have openings, such as holes, at side walls for heating the soil from the side walls of the soil box, in addition to heating at a top surface. The openings can be configured so that the heating is uniform in the soil box, e.g., to achieve fast and/or even heating of the soil material.

Figure 12A:
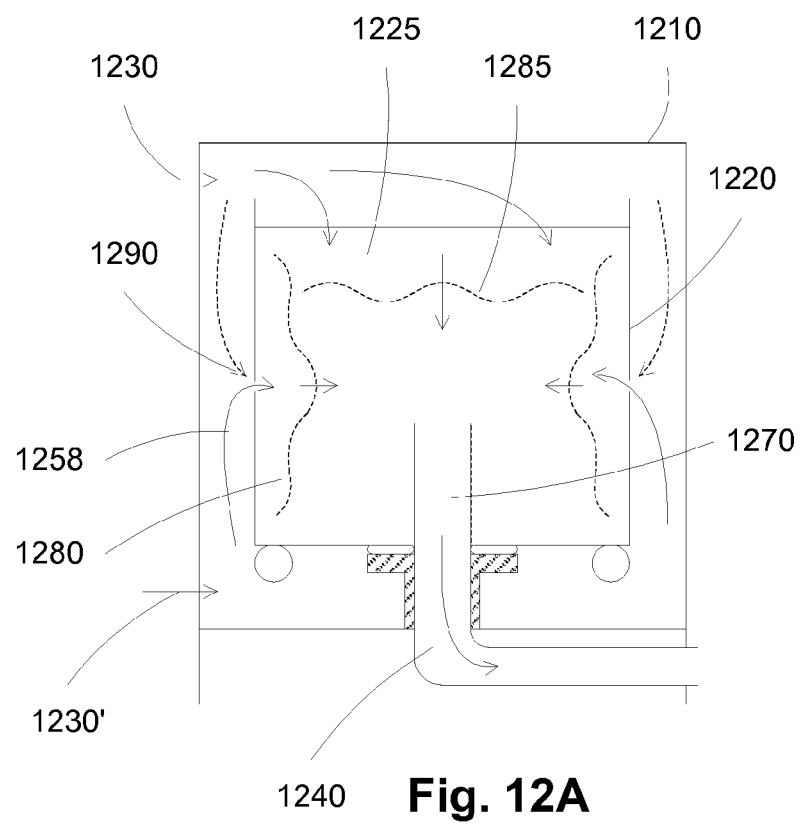
FIGS. 12A-12C illustrate another soil box configuration to reduce treatment time according to some embodiments.
Figures 12B, 12C:
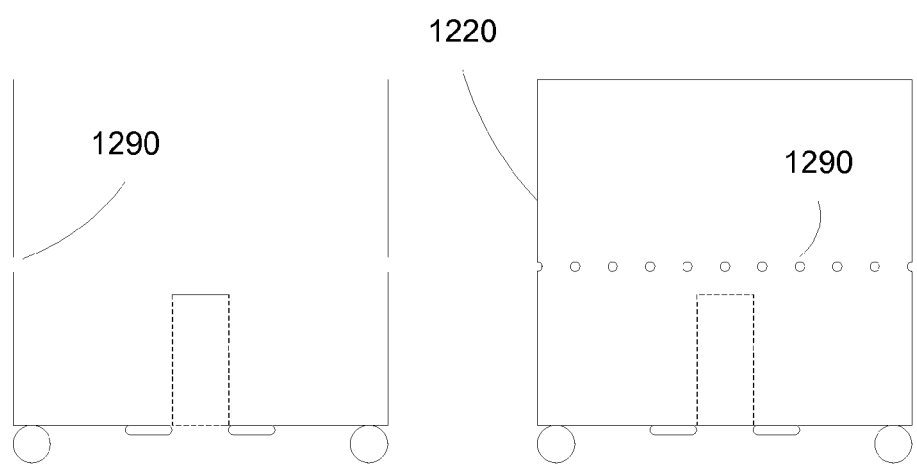
Figures 14A, 14B:
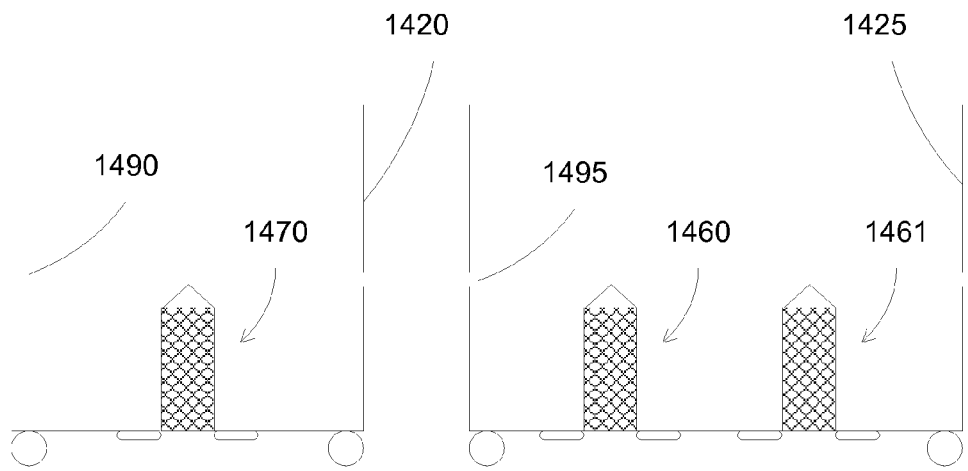
FIGS. 14A-14D illustrate another example of a soil box according to some embodiments.
Figures 14C, 14D:
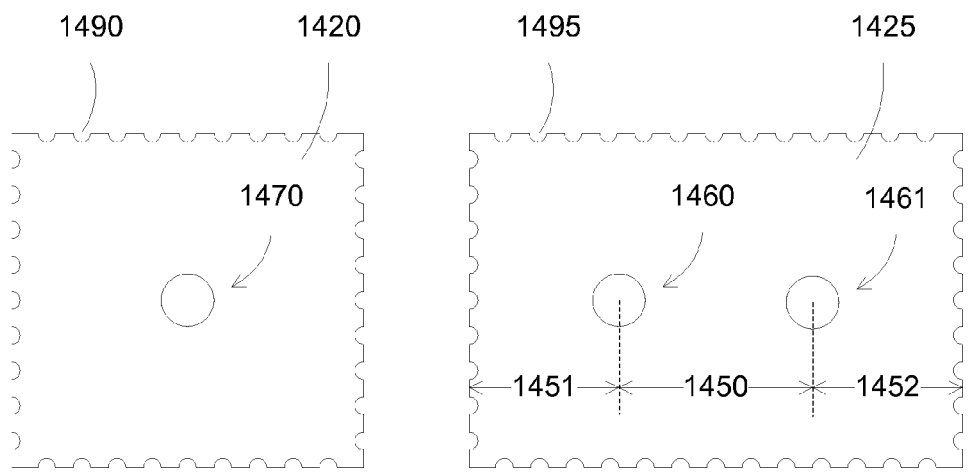

FIGS. 12A-12C illustrate another soil box configuration to reduce treatment time according to some embodiments. The soil box 1220, containing contaminated soil 1225, can be placed in a treatment chamber 1210, which accepts a hot and dry treatment gas 1230. The soil box 1220 can contain a gas exit pathway 1270 located near the bottom of the soil box. The gas exit pathway 1270 of the soil box 1220 can be coupled to an exhaust 1240 to exit the treatment chamber. The treatment gas 1230 can approach the open top of the soil box, creating a distillation front 1285 that can treat the contamination downward. Multiple small holes 1290 positioned on the sides of the soil box 1220 can allow heat to penetrate to the middle of the soil box, for example, from the treatment gas 1230. The penetrated heat from the small holes can change the profile of the side distillation fronts 1280 that can treat the contamination in the soil box sideward.

In addition, the heater inlets into the treatment chamber can be re-arranged to reduce the occurrence of condensation within the soil bed. For example, heating front or heating source (such as heaters) can be placed within the lower portion of the chamber to reduce temperature stratification in the soil box. The hot and dry treatment gas 1230' can be provided at the lower portion of the treatment chamber. Hot gas 1258 delivered from the floor, for example, in a knife like fashion (slit in floor creates linear hot air directed flow across box sides upward toward the top of the soil box). The hot gas flow reduces temperature stratification within treatment chamber.

The combination of the centered vapor extraction trunk, rearrangement of some heater inlets to the lower portion of the treatment chamber and small holes in the soil box sides can reduce the occurrence of condensation within the soil bed and reduce treatment times.

FIGS. 12B and 12C show a cross section view and a top view of a soil box according to some embodiments. The hole pattern 1290 can be provided around the soil box 1220, at about the middle of the height of the soil box. Other hole patterns can also be used, such as multiple rows of holes. The size of the hole can be about 20 cm or less than about 10 cm. The separation between holes can be between 20 and 200 cm, or between 20 and 100 cm.

In some embodiments, the vapor extraction lines can have stainless steel wire wrap well screen to provide the maximum open area for vapor flow. The well screen also can be double wall with thermally resistant filter media such as steel wool or well pack sand.

In some embodiments, the vapor extraction lines and vapor flow path can require a simple flow path without unnecessary turns to improve the flow efficiency. The vapor extraction line design can include a large diameter vapor extraction trunk with smaller wire wrap well screens. The small well screens can be double walled with thermally resistant packing material in the annulus. The small screens can offer more open area for vapor flow and eliminate unnecessary turns in the vapor flow path. The center vapor extraction trunk draws all vapors to the center of the soil box. Condensation zones can be reduced or eliminated.

FIGS. 13A-13G illustrate examples of a soil box according to some embodiments. In FIG. 13A, a soil box can include a vapor extract line 1370 disposed in the middle of the soil box. As shown, the vapor extract line 1370 is a cylindrical conduit, but other cross sections 1380 can be used, such as square or rectangular. The dimension of the vapor extraction line, e.g., the diameter of the cylindrical conduit, can be between 5 and 30 cm. The dimension of the vapor extraction line can be related to the soil box dimension, such as between 5 to 10 or 30% of the size of the soil box. The height of the vapor extraction line can be about 40 to 60 cm, or can be related to the soil box dimension, such as between a quarter to a half of the height of the soil box. In some embodiments, the height of the vapor extraction line is about a third of the height of the soil box.

The vapor extract line 1370 can have screen openings 1375 for receiving the treatment gas to release to the outside of the soil box. The screen openings 1375 can be disposed around the vapor extraction line 1370. In some embodiments, the screen openings can also be positioned at the top of the vapor extraction line. The length of the well screen openings can be short, for example, less than about 10 or 5 cm. The well screen openings can be smaller than the diameter of the trunk, for example, between 1 and 10 cm. The screen can allow gas to escape and blocking the soil from falling out of the soil box. The screen size, e.g., the porosity of the screen or the ratio of the non-blocking portion of the screen, can be between 10 and 90%. The well screens can include continuous-slot (wire wrap) screens of a triangular-shaped wire wrapped around an array of rods. The well screens can have as large a percentage of non-clogging slots as possible to ease the escape of the treatment gas. The well screens can be resistant to corrosion, have sufficient strength to resist collapse, and prevent sand pumping.

FIG. 13B shows another example of a soil box according to some embodiments. The soil box can include a vapor extract line 1371 disposed in the middle of the soil box. The diameter of the vapor extract line 1371 can be between 5 and 20 inches, such as between 5 and 15 inches. The vapor extract line 1371 can have screen openings 1381 for receiving the treatment gas to release to the outside of the soil box. The screen openings 1381 can be disposed around the vapor extraction line 1371 and consist of a double wall pre-pack well screen with thermally stable filter media in the annulus. The well screen may be continuous. The top portion 1361 of the vapor extraction line 1371 can be a solid plate, for example, to prevent foil from falling to the exit line. In some embodiments, top 1361 of the vapor extraction line 1371 can include screen openings.

FIG. 13C shows another example of a soil box according to some embodiments. The soil box can include a vapor extract line 1372 disposed in the middle of the soil box. The vapor extract line 1372 can have a larger portion 1382 disposed on a smaller portion 1392. The larger portion 1382 can include screen openings for receiving the treatment gas to release to the outside of the soil box. The screen section 1382 consists of a double wall pre-pack well screen with thermally stable filter media in the annulus. The well screen may be a continuous slot screen. The top portion 1362 of the vapor extraction line 1372 can be a solid plate, for example, to prevent soil from falling to the exit line. In some embodiments, the screen openings can also be positioned at the top 1362 of the vapor extraction line. The smaller portion can be solid or can have screen openings. Other configurations can be used, such as a well screen for the top portion 1362 and a solid wall for the side portion 1382.

FIG. 13D shows another vapor extract line 1373 with top portion 1363 having screen openings and side portion 1383 having a solid surface. In some embodiments, side 1383 of the vapor extraction line 1373 can include screen openings.

FIG. 13E shows another example of a soil box according to some embodiments. The soil box can include a vapor extract line 1374 disposed in the middle of the soil box. The vapor extract line 1374 can have screen openings 1384 for receiving the treatment gas to release to the outside of the soil box. The screen section 1384 consists of a double wall pre-pack well screen with thermally stable filter media in the annulus. The well screen may be a continuous slot screen. The top portion 1364 of the vapor extraction line 1374 can be a solid cone, for example, to prevent foil from falling to the exit line, and to ease the dumping of the soil out of the soil box. For example, the soil can be removed from the soil box by an inversion of the soil box, for example, by a fork lift. The slanted angle of the cone-shape top 1364 can improve the removal of the soil, preventing soil from sticking to the soil box during dumping. In some embodiments, the screen openings can also be positioned at the top 1364 of the vapor extraction line. Other configurations can be used, such as a well screen for the top portion 1364 and a solid wall for the side portion 1384.

FIG. 13F shows another example of a soil box according to some embodiments. The soil box can include a vapor extract line 1375 disposed in the middle of the soil box. The vapor extract line 1375 can have screen openings 1385 for receiving the treatment gas to release to the outside of the soil box. The screen section 1385 consists of a double wall pre-pack well screen with thermally stable filter media in the annulus. The well screen may be a continuous slot screen. The top portion 1365 of the vapor extraction line 1375 can be a solid cone. In some embodiments, the screen openings can also be positioned at the top 1365 of the vapor extraction line. The bottom portion 1395 of the vapor extraction line 1375 can also have a cone shape, either screen or solid, for example, to ease dumping of the soil from the soil box. Other configurations can be used, such as a well screen for the top portion 1365 and a solid wall for the side portion 1385.

FIG. 13G shows another example of a soil box according to some embodiments. The soil box can include a vapor extract line 1376 disposed in the middle of the soil box. The vapor extract line 1376 can have screen openings 1386 for receiving the treatment gas to release to the outside of the soil box. The screen section 1386 consists of a double wall pre-pack well screen with thermally stable filter media in the annulus. The well screen may be a continuous slot screen. The vapor extraction line can also have a cone shape. The slanted angle of the cone-shape 1386 can improve the removal of the soil, preventing soil from sticking to the soil box during dumping. The top portion 1366 of the vapor extraction line 1376 can be a solid cone, for example, to prevent soil from falling to the exit line, and to ease the dumping of the soil out of the soil box. In some embodiments, the screen openings can also be positioned at the top 1366 of the vapor extraction line. The cone shape top 1366 and the cone shape 1386 can have different slanted angles (as shown), or can have similar angle (not shown). A small portion at the bottom of the cone shape 1386 can be solid instead of screened, similar to that in FIG. 7C. Other configurations can be used, such as a well screen for the top portion 1366 and a solid wall for the side portion 1386.

FIGS. 14A-14D illustrate another example of a soil box according to some embodiments. The soil box 1420 can include opening 1490 and one vapor extract line 1470 disposed in the middle of the soil box. In some embodiments, the configuration of the openings 1490/1495 can be arranged to optimize the uniform heating of the soil in the soil box and multiple vapor extraction lines can be used, for example, for rectangular soil box. For example, for a soil box 1425 can include opening 1495 having dimensions of 5 ft wide by 8 ft length by 5.5 ft height, two vapor extraction lines 1460 and 1461 can be used. The placement of the vapor extraction lines 1460 and 1461 can be designed to optimize a gas flow from the soil box, e.g., a high conductance path for the hot treatment gas and the contaminants (e.g., the hydrocarbons collected by the soil) to exit after the contaminants being separated from the soil. The distance 1450 between the two vapor extraction lines 1460 and 1461 can be from the same distance 1451 or 1452 from one of the vapor extraction lines to the soil box side to about twice or three times the distance 1451 or 1452. The distance 1451 or 1452 can be between one quarter and one third of the length of the soil box.

In the figures, two vapor extraction lines 1460 and 1461 are shown, but other number of vapor extraction lines can be used, such as 3, 4, 5, or 6 lines. Further, shown is a vapor extraction line having a cone shape top and a cylindrical side, but other shapes can be used, such as a cylindrical shape, or other shapes shown above.

In some embodiments, the soil box can be configured to be heated from multiple sides, thus can improve the desorption efficiency such as preventing condensation zones. For example, as soil is treated in the soil box, soil moisture and contaminants can condense as they move toward the vapor extraction lines. The center of the soil box would become more difficult to treat as soil moisture condensed within the core of the soil bed. Treating the condensation zones would require extending the treatment times.

In some embodiments, methods and system to alter vapor flow pathways and warming the center of the soil bed can reduce condensation within the core of the soil bed, which can decrease the treatment time. Multiple heat propagation fronts, e.g., hot air movement across box sides and small diameter hole from the top and the sides of the soil box, can create multiple coalescing dry distillation fronts moving toward the hot air vapor extraction lines.

Figure 15A:
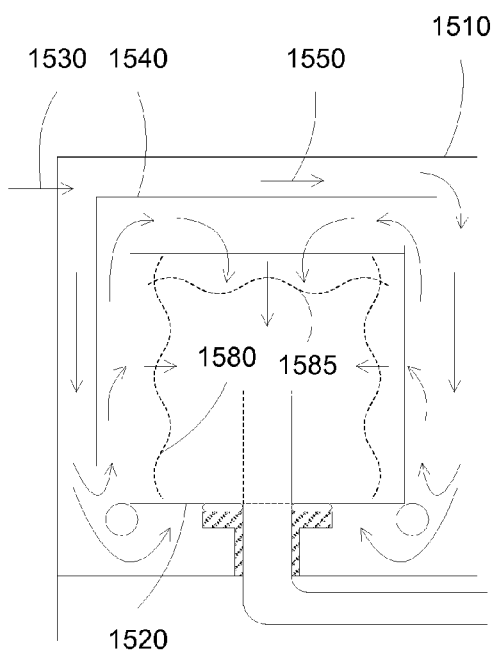
FIGS. 15A-15C illustrate some soil box configurations to reduce treatment time according to some embodiments.
Figure 15B:
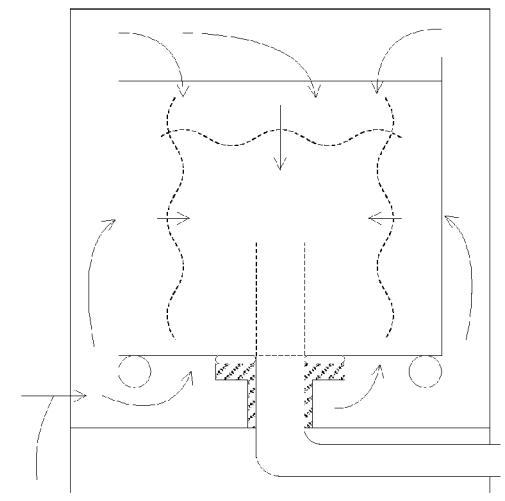
Figure 15C:
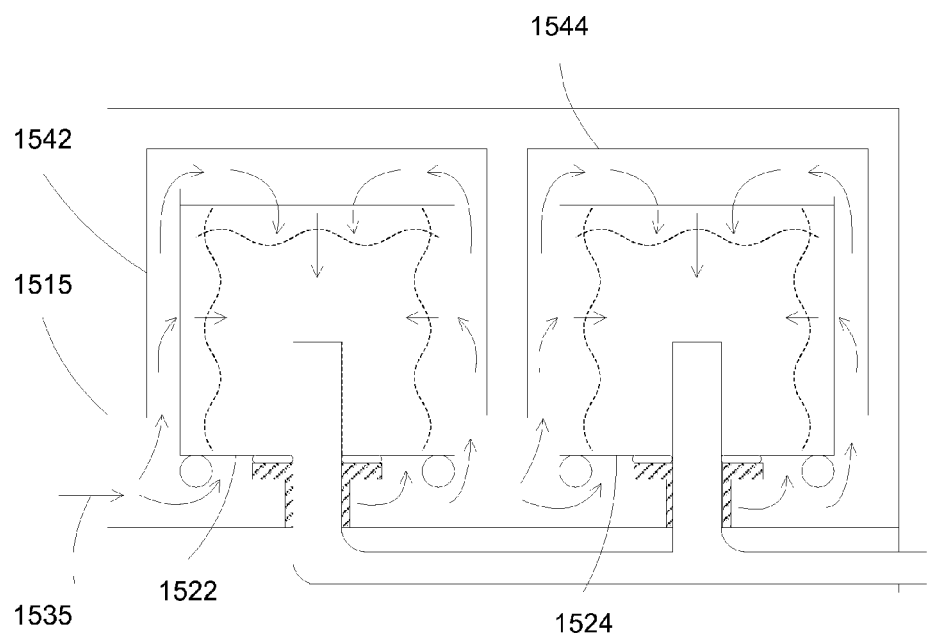

FIGS. 15A-15C illustrate some soil box configurations to reduce treatment time according to some embodiments. In FIG. 15A, a shroud 1540 can be placed around the soil box 1520, which can optimize the heating pattern 1550 of the soil box. A hot treatment gas 1530 can be introduced to the treatment chamber 1510, which starts heating the soil box at the bottom side, then heating the sides of the soil box before heating the top opening of the soil box. The heating of the sides of the soil box can create dry distillation fronts 1580 from the sides to the middle of the soil box. The heating of the top of the soil box can also create a dry distillation front 1585 from the top to the middle of the soil box. Faster decontamination of the soil in the soil box can be performed through the multiple simultaneous distillation fronts.

In FIG. 15B, similar effect can be achieved by introducing a dry hot treatment gas 1535 at the bottom of the soil box. The bottom treatment gas 1535 can start heating at the bottom, then propagating to the sides and the top of the soil box. Multiple distillation fronts can be generated for high throughput processing.

In FIG. 15C, a treatment chamber 1515 can contain multiple soil boxes 1522 and 1524, each has a shroud 1542 and 1544, respectively, to distribute the hot treatment gas 1535. The shrouds can create multiple distillation fronts to the soil boxes, increasing the effectiveness of the contamination treatment process.

In some embodiments, the soil box configuration can include small holes along the side of the soil box, which can draw some hot air into the middle of the soil keeping temperatures warm as the heat front propagates through the soil bed. The small holes can be provided on the sides of the soil box, for example, to short circuit a small volume of hot air.

In some embodiments, the soil box or boxes can be heated by arranging the heaters at different elevations in the treatment chamber. Arranging the heaters at different elevations can eliminate the need for a shroud.

FIGS. 16A-16D illustrate some soil box configurations to reduce treatment time according to some embodiments. In FIGS. 16A-16B, the soil box can have openings 1690, e.g., holes, in the walls of the soil box 1620. The configuration of the openings 1690 can be arranged to optimize the uniform heating of the soil in the soil box. As shown, two rows of openings 1690 are provided at the walls surrounding the soil box. Other configurations can be used, such as one row or three rows. In some embodiments, mesh walls for the soil box can be used. The soil box can have screen walls, which can allow heating from the top and the sides, and optional the bottom, of the soil box.

In FIGS. 16C-16D, pipes or plates 1620 can be coupled to the walls of the soil box for providing heating gas to the soil. Heating gas can be introduced to the pipes or plates 1620, and a portion of the heating gas can leave the pipes or plates 1620 to enter the soil.

In some embodiments, the openings are configured to provide a uniform heating front for the soil in the soil box. For example, higher heating can be experienced at a middle of the soil box as compared to at the edges of the soil box. Openings at the walls of the soil box can equalize the heating profile.

Figure 17A:
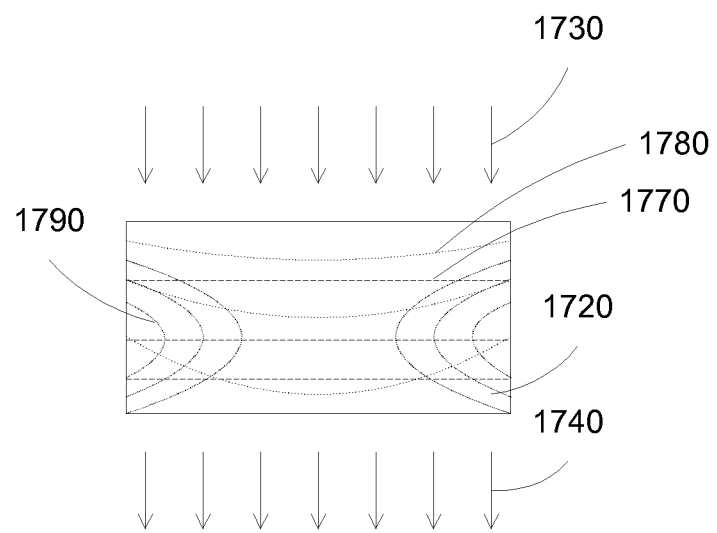
FIGS. 17A-17B illustrate a heating profile for a soil box according to some embodiments.
Figure 17B:
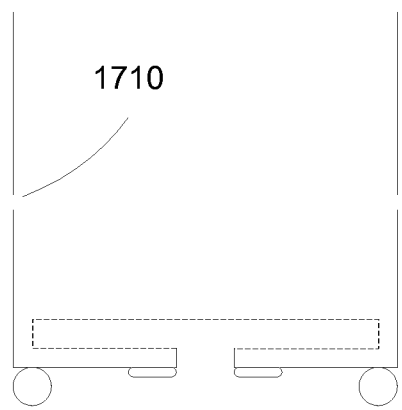

FIGS. 17A-17B illustrate a heating profile for a soil box according to some embodiments. Soil 1720 can be heated from the top 1730, having heating profiles 1780 that are hotter in the middle. Soil can be heated from the openings at side walls, having heating profiles 1790 that are hotter at the openings inward. With proper designs of the openings, the combination of the two heating profiles 1780 and 1790 can form uniform heating profiles 1770, which can generate uniform exhaust gas flow 1740, leading to uniform heating of the soil, and faster throughput in treating the soil. The combination heating profiles 1770 can be achieved in a soil box 1710 having openings at selected placed in the side walls of the soil box.

Figure 18A:
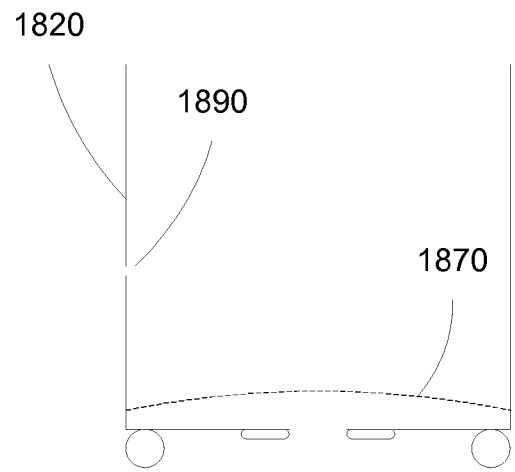
FIGS. 18A-18B illustrate soil box having side wall openings according to some embodiments.
Figure 18B:
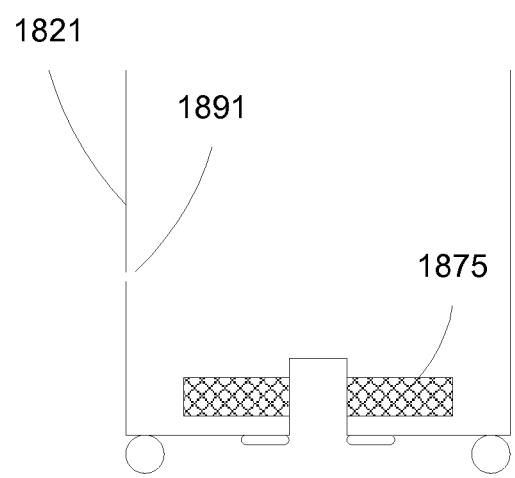

FIGS. 18A-18B illustrate soil box having side wall openings according to some embodiments. In FIG. 18A, a soil box 1820 can have openings 1890, which are configured to generate uniform heating profiles for a curved screen 1870 located at a bottom section of the soil box. In FIG. 18B, a soil box 1821 can have openings 1891, which are configured to generate uniform heating profiles for tubular screen exhaust conduits 1875 located at a bottom section of the soil box.

FIGS. 19A-19B illustrate flow charts for generating uniform heating profiles according to some embodiments. In FIG. 19A, operation 1900 provides a soil box, wherein the soil box comprises an inner volume for containing a material, wherein the soil box comprises a top opening for accepting the material, wherein the soil box comprises one or more side openings at a sidewall of the soil box. Operation 1910 forms an exhaust outlet for the soil box, wherein the exhaust outlet is configured to contain the material in the soil box, wherein the exhaust outlet is configured so that a gas provided to the top and side openings forms a substantially uniform flow through the material to the exhaust outlet. The side openings can be disposed at middle or below the middle of the side walls of the soil box. The side openings can be placed around the soil box. The side opening can be from a conduit disposed at the side wall.

In FIG. 19B, operation 1930 provides a soil box, wherein the soil box comprises an inner volume for containing a material, wherein the soil box comprises a top opening for accepting the material, wherein the soil box comprises one or more side openings at a sidewall of the soil box. Operation 1940 forms an exhaust outlet at a bottom of the soil box. Operation 1950 forms a screen conduit coupled to the exhaust outlet, wherein the screen conduit is configured so that a gas provided to the top and side openings forms a substantially uniform flow through the material.

In some embodiments, methods and systems for producing hot treatment gas at a bottom portion of the soil box are provided. A hollow tube can provide hot gas to sides of soil box to create hot gas fronts from four sides of soil box, increasing throughput and minimizing condensation of hydrocarbon contaminants. Holes or narrow slits can be formed on the hollow tube to provide hot gas flow. The holes or slits can be configured to deliver high velocity hot gas movement to box sides.

In some embodiments, the hollow tube can form a cradle, which can create a tight keyed landing area for the soil box. Hollow tube designed to minimize movement of the soil box when the soil box is positioned in the treatment chamber.

In some embodiments, the hollow tube can form a ring surrounding the soil box area. Alternatively, the hollow tube can have a cut out, for example, to allow lifting of the soil box, for example, by a fork lift. The hollow tube can include multiple segments disposed around the soil box area.

FIGS. 20A-20C illustrate a gas delivery configuration for a soil box according to some embodiments. The soil box 2020, containing contaminated soil 2025, can be placed in a treatment chamber 2010. The soil box 2020 can contain a gas exit pathway 2070 located near the bottom of the soil box. The gas exit pathway 2070 of the soil box 2020 can be coupled to an exhaust 2040 to exit the treatment chamber. A hollow tube 2092 can form a cradle to contain the soil box 2020. Hot treatment gas 2030 can be provided to the hollow tube 2092, which then can deliver hot treatment gas to a bottom area of the soil box. As shown, the hollow tube 2092 has openings 2094 to allow escape gas 2050 to the bottom sides of the soil box. Other configurations can also be used, such as bottom openings, to replace the side openings or to supplement the side openings, which can deliver hot treatment gas to the bottom of the soil box. The openings can be long slits, or multiple short slits, or multiple holes along the sides. Multiple small holes 2090 positioned on the sides of the soil box 2020 can allow the hot gas 2050 to penetrate to the middle of the soil box. The soil box can have handles at the sides, for example, to allow a fork lift to pick up and deliver to the treatment chamber.

FIGS. 21A-21D illustrate other gas delivery configurations for a soil box according to some embodiments. In FIGS. 21A and 21B, the hollow tube 2192 can have a cut out 2196, for example, to allow a fork to enter the area under the soil box to lift the soil box. In FIGS. 21C and 21D, the hollow tube 2191 can have a recess 2197, which provides an opening 2198, for example, to allow a fork to enter the area under the soil box to lift the soil box.

In some embodiments, a pedestal support can be provided for connecting the outlet of the soil box with the exhaust of the treatment chamber. The pedestal soil box support can provide ease of installation and removal of the soil box from the insulated treatment chamber. The soil box can have a gas exit pathway located at the bottom of the soil box. The treatment chamber can have an exhaust, which is configured to be coupled to the gas exit pathway to receive the treated gas from the soil box.

In some embodiments, the coupling between the soil box and the treatment chamber, e.g., the connection between the gas exit pathway of the soil box and the exhaust inlet of the treatment chamber, can be configured to be automatically sealed when the soil box is placed in the treatment chamber. The treatment chamber can include a pedestal support, which can be arranged to be aligned with the outlet opening of the gas exit pathway of the soil box. The pedestal support can also have an opening inlet, which can be configured to mate with the opening outlet of the gas exit pathway.

In some embodiments, the connection of the gas exit pathway to the exhaust inlet can be to place the soil box on the pedestal support. Once installed, the weight of the contained soil can provide a sufficient seal at the contact between the soil box bottom and the pedestal soil box support. Sealing materials, such as soft braided rings, can be included to either the outlet opening of the gas exit pathway or the inlet opening of the exhaust pathway to reduce potential leakage. Vacuum and/or pressurized gas can also be included to assist in improving the seal, such as to suck down the seal gasket or to lift the gasket against the soil box.

The pedestal support, together with the gasket seal, can facilitate the docking of the soil box in the treatment chamber, providing simple alignment of the soil box outlet with the treatment chamber inlet exhaust. The pedestal support can include a raised structure for resting the soil box in the treatment chamber. The raised structure can include a gasket sealed connection to the vapor extraction line leading to the vapor treatment arrangement. The pedestal connection can be configured to compensate for thermal expansion between the soil box opening and the vapor extraction line leading to vapor treatment. In some embodiments, the pedestal connection can eliminates the need for physical connection operations.

In addition, a hot gas cradle can be used as guides to direct the soil box to the hot air cradle. For example, the hollow tube of the cradle can be designed to minimize movement of box when landed on pedestal connection to preserve integrity of gasket seals.

Figure 22A:
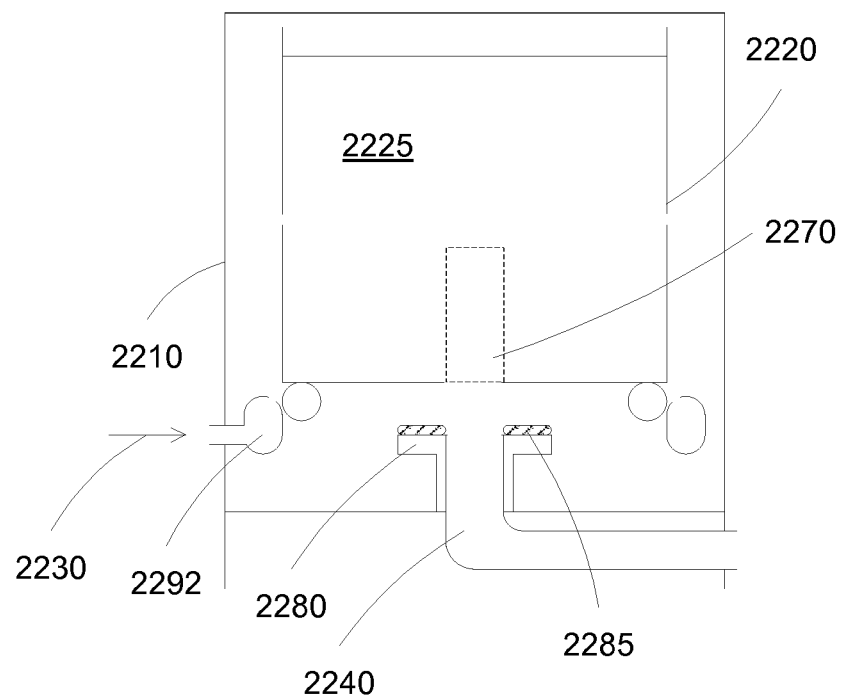
FIGS. 22A-22B illustrate a pedestal support for a soil box according to some embodiments.
Figure 22B:
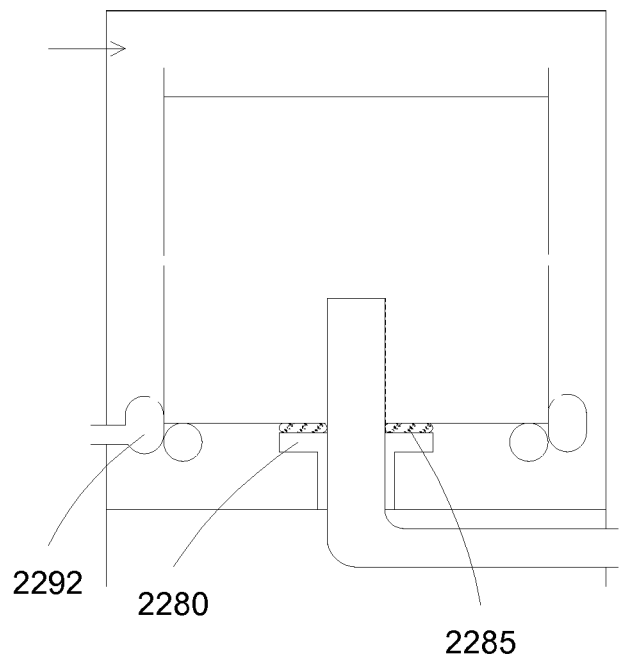

FIGS. 22A-22B illustrate a pedestal support for a soil box according to some embodiments. The soil box 2220, containing contaminated soil 2225, can be placed in a treatment chamber 2210, which accepts a hot and dry treatment gas 2230. The soil box 2220 can contain a gas exit pathway 2270 located near the bottom of the soil box. The gas exit pathway 2270 of the soil box 2220 can be coupled to an exhaust 2240 to exit the treatment chamber. A pedestal support 2280 can be used to facilitate the connection between the gas exit pathway 2270 and the exhaust 2240. A seal gasket 2285 can be optionally installed to improve the seal between the gas exit pathway 2270 and the exhaust 2240.

The soil box can be delivered to the treatment chamber, for example, by a fork lift. The soil box can be positioned above the pedestal support 2280. A hollow tube 2292 can form a cradle to reduce the lateral movement of the soil box 2220. Hot treatment gas 2230 can be provided to the hollow tube 2292, which then can deliver hot treatment gas to the bottom of the soil box. The hollow tube 2292 can align the soil box with the treatment chamber, e.g., to mate the gas exit pathway 2270 with the exhaust 2240. The seal gasket can be installed in the soil box or in the pedestal support.

FIGS. 23A-23B illustrate flow charts for forming cradle for a soil box according to some embodiments. In FIG. 23A, operation 2300 forms a treatment chamber, wherein the treatment chamber is configured to contain a soil box. Operation 2310 forms a cradle in the treatment chamber, wherein the cradle is configured to form a mating landing area for the soil box, wherein the cradle is hollow for accepting a treatment gas to be delivered to a sidewall of the soil box.

In FIG. 23B, operation 2330 loads contaminated soil into a soil box. Operation 2340 brings the loaded soil box to a treatment chamber. Operation 2350 places the soil box on a cradle in the treatment chamber, wherein soil box is mated to the cradle, wherein the cradle is hollow for accepting a treatment gas to be delivered to a sidewall of the soil box.

In some embodiments, the present invention discloses systems and methods for soil box heating without being degraded, for example, by a condensation front. When heating the soil, the heat front can propagate toward the inside of the soil. A condensation front can exist ahead of the heat front propagation. The condensation front can affect the treatment of the soil, e.g., reducing the efficiency of vaporizing the liquid-phase hydrocarbon contaminants.

In some embodiments, the present invention discloses a heating distance between heating sources that can reduce or eliminate condensation front in a thermal desorption process. Depending on the soil and the contaminant constituents, a condensation front can occur at between 40 and 85 cm, such as between 50 and 75 cm, or between 60 and 65 cm. Thus heat sources can be placed closer to the condensable distance, e.g., the distance that a condensation front can formed from a heat source.

Figure 24A:
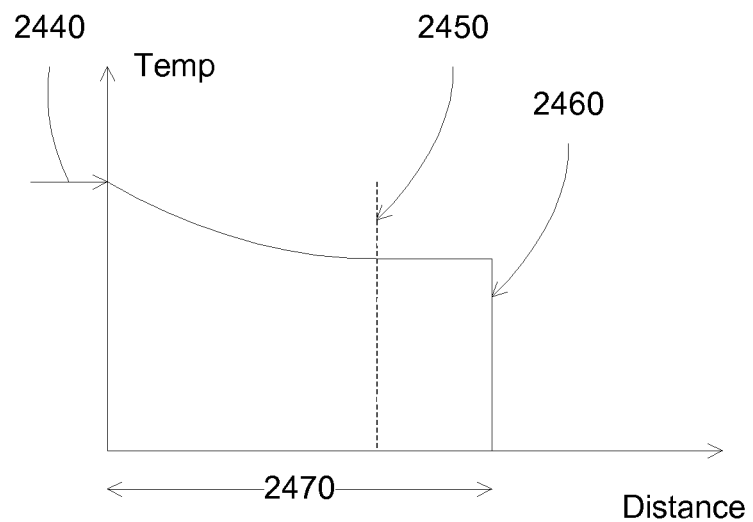
FIGS. 24A-24B illustrate a condensation front schematic and the effect on soil heating according to some embodiments.
Figure 24B:
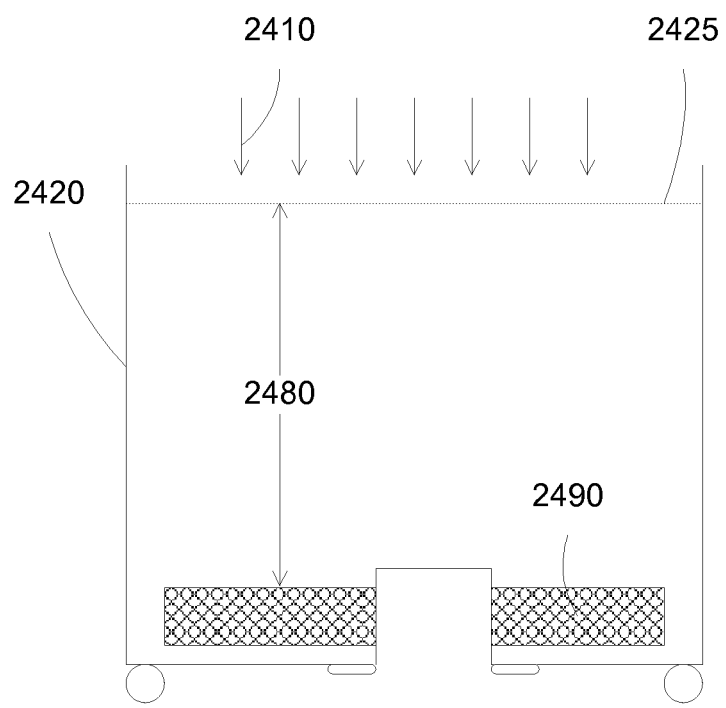

FIGS. 24A-24B illustrate a condensation front schematic and the effect on soil heating according to some embodiments. In FIG. 24A, a heat source 2440 can be provided to a soil material in a soil box. The heat source can propagate through the soil, forming a vaporization front 2450 at which volatile contaminants can be vaporized. At a distance in front of the vaporization front 2450 is a condensation front 2460, at which the volatile contaminants can be condensed, e.g., turning into liquid from a partially liquid-vapor phase in the soil. The condensation area can reduce the efficiency of the thermal desorption process, since the contaminants are condensed at the condensation front, and will need to be vaporized when the vaporization front reach the liquid-phase contaminants. Typically, the condensable distance 2470, e.g., the distance between the heat source 2440 and the condensation front 2460, can be between 40 and 85 cm depending on the soil, the contaminants, and the heat power.

In some embodiments, the present invention discloses a soil box having heat propagation distance to be less than the condensable distance. FIG. 24B shows a soil box 2420 configuration, which accepts a heat source 2410, e.g., heated gas from an enclosed treatment chamber. A vapor extraction exhaust 2490 can be placed in the soil box 2420 for exhausting the heated gas, after the heated gas reacts with the contaminants in the soil. The thickness of the soil, e.g., the distance 2480 from the top surface 2425 of the soil to the vapor extraction exhaust 2490, can be less than the condensable distance, for example, between 40 and 85 cm, or between 60 and 65 cm.

Figure 25A:
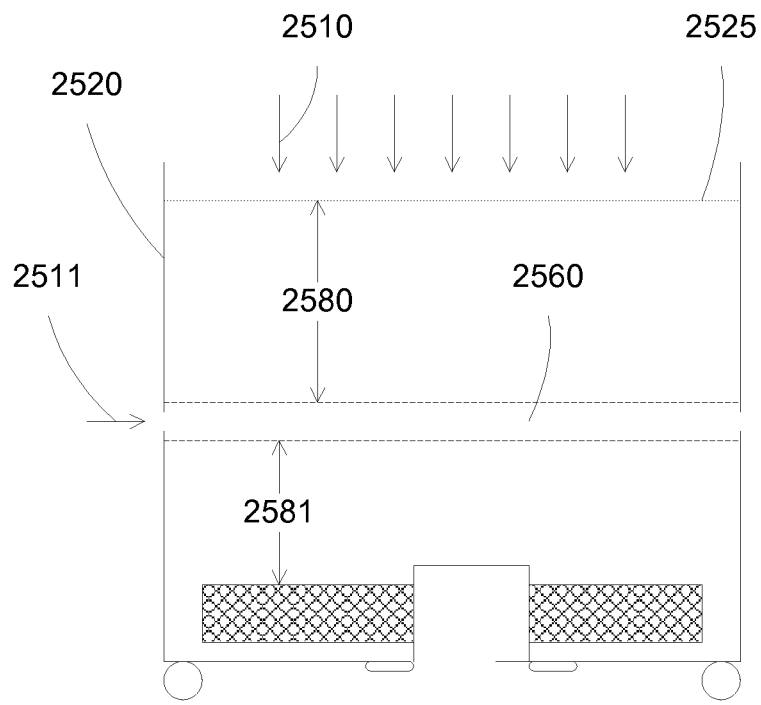
FIGS. 25A-25D illustrate soil box configurations which can minimize contaminant condensation according to some embodiments.

FIGS. 25A-25D illustrate soil box configurations which can minimize contaminant condensation according to some embodiments. In FIG. 25A, a soil box 2520 can have a secondary heater source 2560 placed between the primary heater source 2510, e.g., the heating gas flowing to the top soil surface 2525. The secondary heater source 2560 can include a tube or a plate, which can accept heated gas 2511 for releasing in the soil box. The secondary heater source 2560 can divide the heat path distance into smaller portions, e.g., one secondary heater source can form two heat path distances 2580 and 2581. The secondary heat source can thus reduce the heat path distance to be less than a condensable distance, e.g., less than 100 cm, less than 65 cm, or less than any distance in between.

Figure 25B:
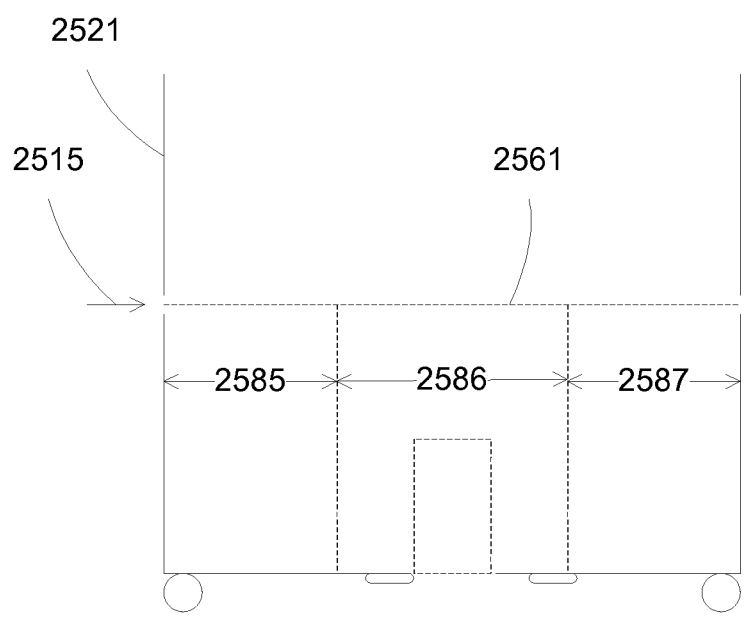

In FIG. 25B, a soil box 2521 can have secondary heater sources 2561 placed in the soil box. The secondary heater source 2561 can include a tube or a plate, which can accept heated gas 2515 for releasing in the soil box. The secondary heater source 2561 can divide the heat path distance into smaller portions 2585, 2586 and 2587, e.g., less than a condensable distance, e.g., less than 100 cm, less than 65 cm, or less than any distance in between.

Figure 25C:
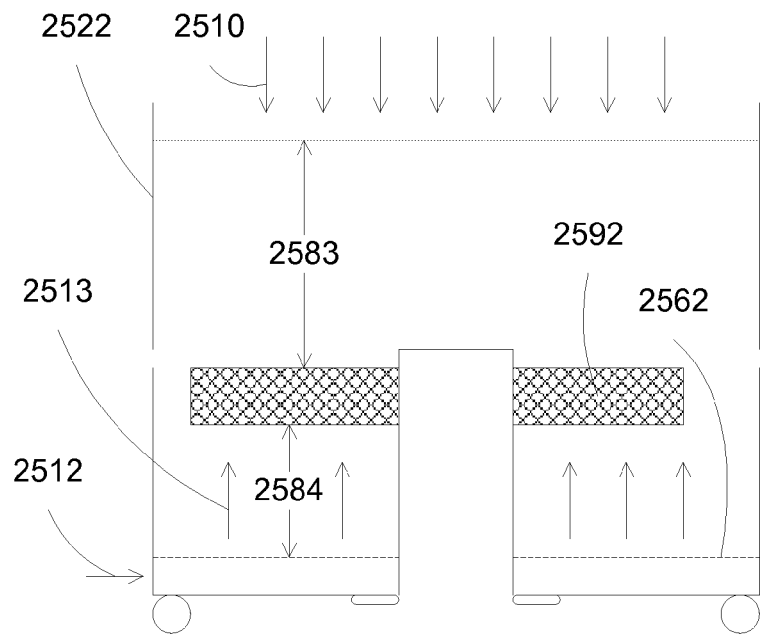

In FIG. 25C, a soil box 2522 can have a secondary heater source 2562 placed at a bottom portion of the soil box. The vapor extraction exhaust 2592 can be placed closer to the top surface, reducing the heat path distance with the input heated gas 2510. The secondary heater source 2562 can include a tube or a plate, which can accept heated gas 2512 for releasing 2513 in the soil box. The secondary heater source 2560 can divide the heat path distance into smaller portions, e.g., heat path distances 2583 and 2584.

Figure 25D:
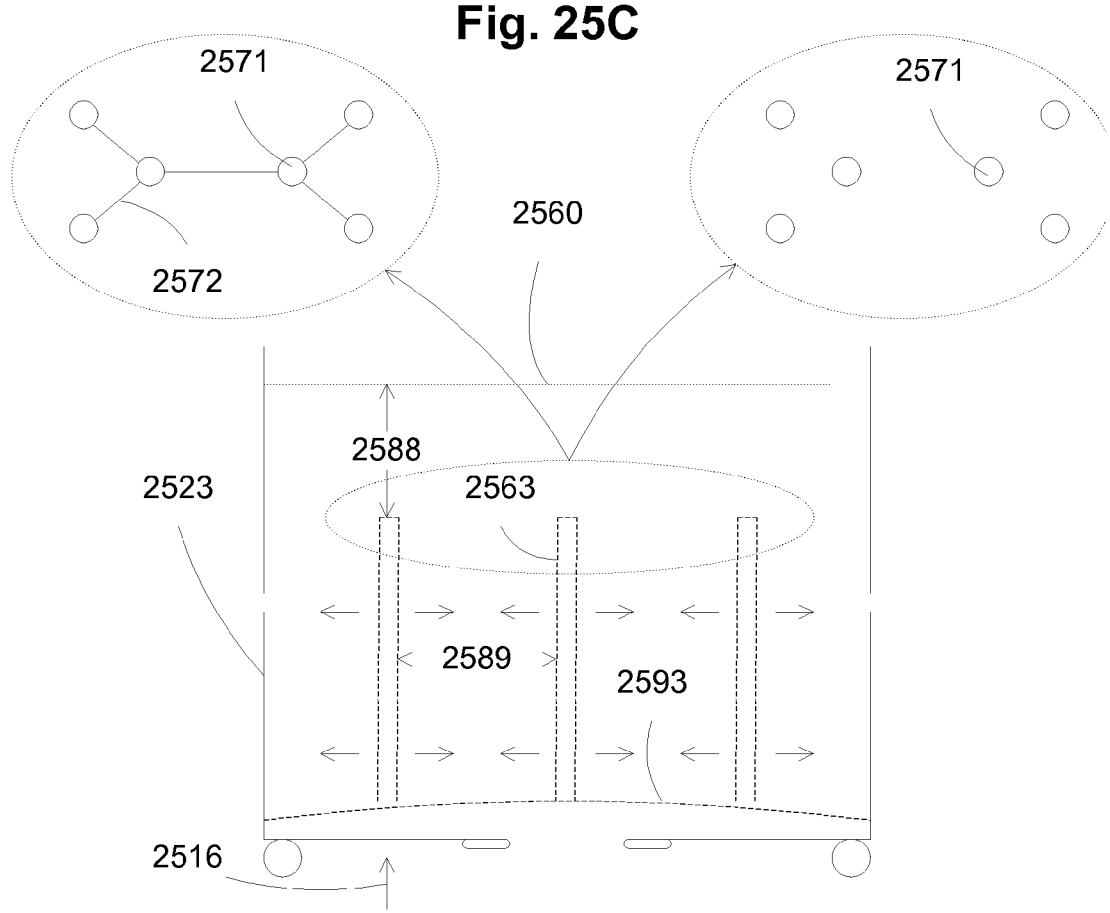

In FIG. 25D, a soil box 2523 can have secondary heater sources 2563 placed vertically in the soil box. The vapor extraction exhaust 2593 can be placed closer to the bottom surface, such as a curve screen plate. The secondary heater source 2563 can include multiple tubes 2571, or tubes 2571 connected to plates 2572, which can accept heated gas 2516 for releasing in the soil box. The secondary heater source 2560 can divide the heat path distance into smaller portions, e.g., heat path distances 2588 and 2589.

FIGS. 26A-26F illustrate other examples of a soil box according to some embodiments. The soil box 2620 can include a vapor extract line 2600 disposed in the middle of the soil box. The vapor extract line 2600 can have middle portion 2679 and cylindrical portions 2675 having screen openings for receiving the treatment gas to release to the outside of the soil box. The cylindrical portions 2675 can be configured in an H shape. The screen section can include a double wall pre-pack well screen with thermally stable filter media in the annulus. The well screen may be a continuous slot screen. The middle portion 2679 of the vapor extraction line 2600 can include solid plates. Other configurations can be used, such as a well screen for the middle portion 2679.

In some embodiments, protection portions 2680 can be included to protect the well screen of the cylindrical portions. In FIGS. 26A-26C, cylindrical protection rods 2680 can be used as protection portion for the cylindrical well screen portions 2675. The cylindrical protection rods 2680 can be slightly smaller than the cylindrical well screen portions 2675. For example, the cylindrical protection rods can be between 40 to 80% of the cylindrical well screen portions, such as about 26 inch diameter for protection rods 2680 in relation to about 10 inch diameter for screen rods 2675. Other configurations can be used, such as similar size or larger size of protection rods as compared to screen rods. For example, the protection rods can be longer, covering the whole length of the soil box, while the diameter of the protection rods is smaller than that of the screen rods.

In FIGS. 26D-26F, protection plates 2685 can be used as protection portion for the cylindrical well screen portions 2675. The width of the protection plates 2685 can be slightly smaller than the diameter of the cylindrical well screen portions 2675. For example, the length of the protection plates can cover the length of the soil box. The width of the protection plates can be between 40 to 80% of the diameter of the cylindrical well screen portions, such as about 26 inch width for protection plates 2685 in relation to about 10 inch diameter for screen rods 2675. Other configurations can be used, such as similar size or larger size of protection plates as compared to screen rods. For example, the protection plates can be shorter, while the width of the protection rods is larger than that of the screen rods.

Figure 27A:
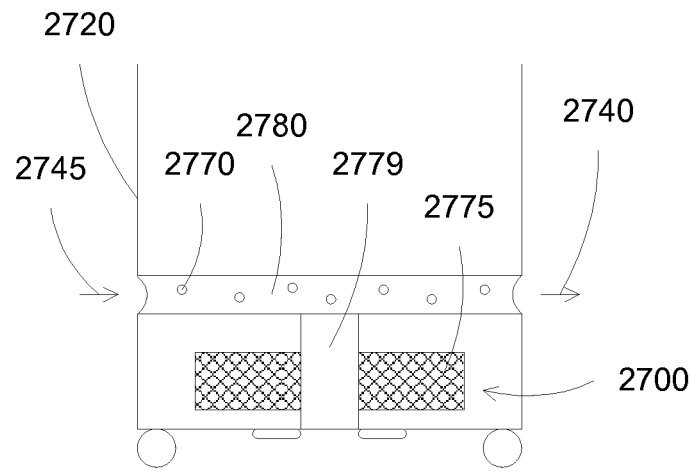
FIGS. 27A-27C illustrate another example of a soil box according to some embodiments.
Figure 27B:
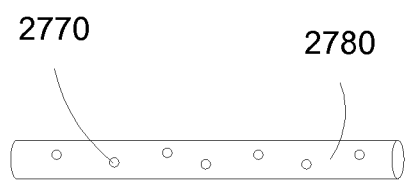
Figure 27C:
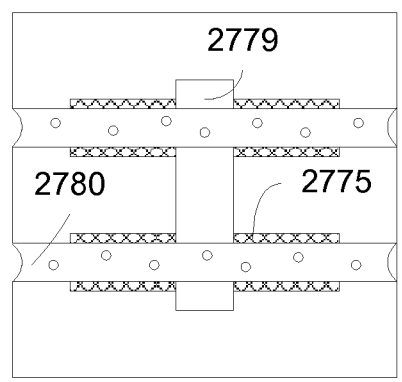

FIGS. 27A-27C illustrate another example of a soil box according to some embodiments. The soil box 2720 can include a vapor extract line 2700 disposed in the middle of the soil box. The vapor extract line 2700 can have middle portion 2779 and cylindrical portions 2775 having screen openings 2775 for receiving the treatment gas to release to the outside of the soil box.

In some embodiments, protection portions 2780 can be included to protect the well screen of the cylindrical portions. Cylindrical protection rods 2780 can be used as protection portion for the cylindrical well screen portions 2775. The cylindrical protection rods 2780 can have openings 2770 and extend outward to the walls of the soil box, to allow extraction 2740 of hot gas from the soil box or inputting 2745 hot gas to the soil box. The protection pipe can be attached on the box wall on one side and strapped to the center 2779 to allow for thermal expansion. In some embodiments, to account for thermal expansion mismatch, the protection pipe is not solidly attached to both walls of the soil box, and can leave a small gap for thermal expansion, e.g., the protection pipe may not run all the way across the entire box. In some embodiments, straps or double wall sliding (e.g., one pipe disposed slidably in another pipe) can be used to account for the thermal expansion.

In some embodiments, systems and methods to treat contaminated soil are provided, including warming towers for heating the soil from inside the soil box. The warming towers can be placed in different locations in the soil box, such as at the middle of the soil box for heating from the center of the soil box outward. The warming towers can be placed in locations that can accelerate the uniform and even heating of the soil. For example, if the soil is heated from a top open surface, e.g., the soil box has an opened top, the top area of the soil box can be hotter than the bottom side. Thus warming towers can be placed about two thirds down from the surface. The heat from the warming towers can move upward and downward for heating the soil. If the warming towers can provide hotter gas than the top surface, then a closer distance, e.g., less than two thirds, to the top surface can be used. In general, the warming tower can provide lower thermal energy as compared to the energy supplied to the top surface, a distance longer than two thirds can be used.

Similarly, thermal energy can be provided to the side and bottom walls of the soil box, heating the soil through the conduction with the soil box walls. For heated bottom wall of the soil box, the soil can also be heated from the bottom, but at a less rate than from the top surface. The warming towers can be placed accordingly, e.g., to quickly heat the soil in the soil box from top surface, bottom surface, and from the warming towers inside the soil box. The warming towers can be placed in a middle from the sides of the soil box to provide thermal energy to the soil. One or more warming towers can be used, with separate distance configured to optimize the heating rate. For example, if the soil box is heated from the sides, e.g., by thermal conduction from the soil box side walls, middle warming towers can complementally heating the soil from the middle outward, meeting the side heat fronts for a fast heating of the soil.

In some embodiments, hot gas can be provided to the warming towers to be distributed to the soil. For example, the warming towers can accept hot gas from outside, and can release hot gas to the soil, such as through openings along or at the ends of the warming towers.

Figures 28A, 28B, 28C:
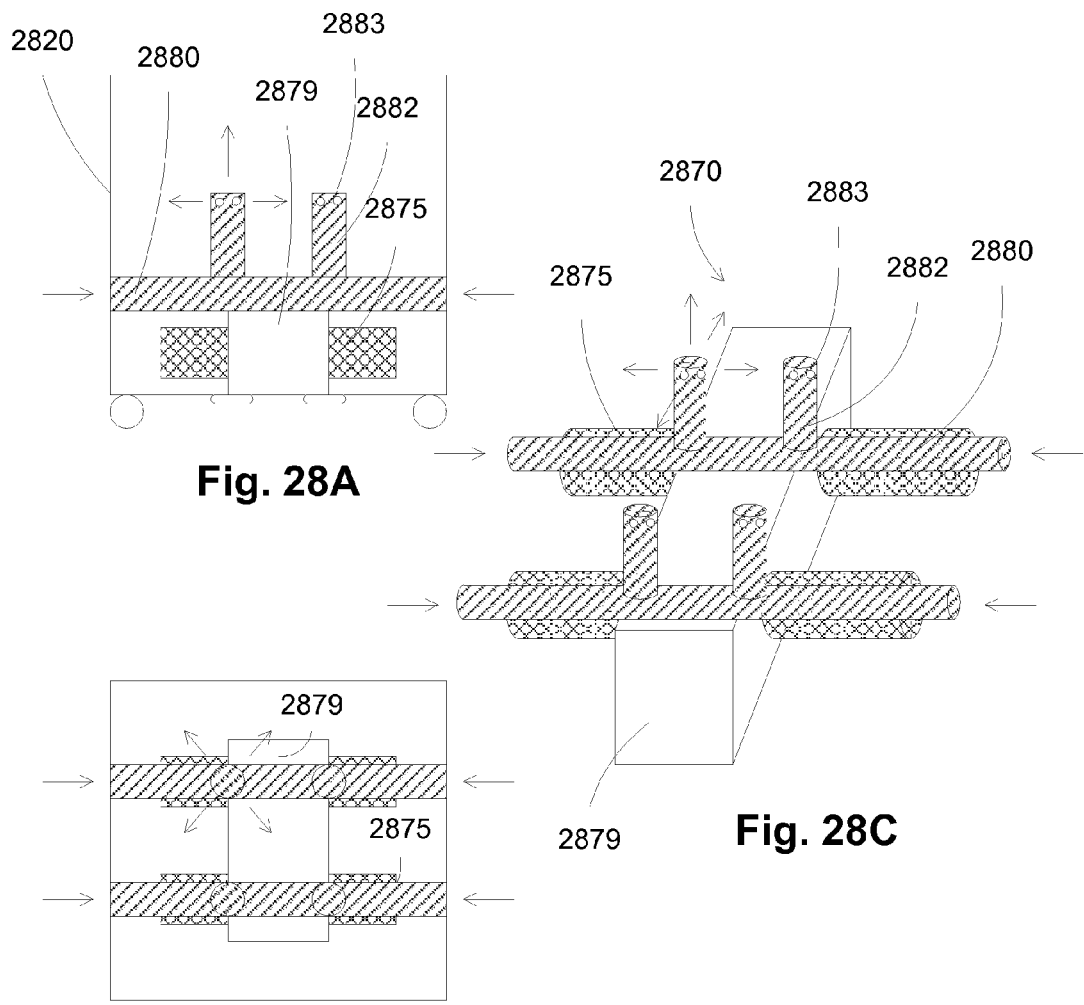
FIGS. 28A-28C illustrate an example of a soil box according to some embodiments.

FIGS. 28A-28C illustrate an example of a soil box according to some embodiments. The soil box 2820 can include a vapor extract line 2870 disposed in a bottom section of the soil box. As shown, the vapor extract line 2870 includes cylindrical conduits 2875, but other cross sections can be used, such as square or rectangular. The conduits 2875 can be coupled to a middle box 2879 in an H configuration. The dimension of the vapor extraction line, e.g., the diameter of the cylindrical conduit, can be between 5 and 280 cm, such as 10 inch screen. The length of the vapor extraction line can be related to the soil box dimension, such as between 70 to 90 or 95% of the size of the soil box. The height of the vapor extraction line can be less than about 60 cm, such as between about 20 to 60 cm, or can be related to the soil box dimension, such as less than a quarter of the height of the soil box.

The vapor extract line 2870 can have screen openings for receiving the treatment gas to release to the outside of the soil box. The screen openings can be disposed around the vapor extraction line 2870. In some embodiments, the screen openings can also be positioned at the top of the vapor extraction line. The length of the well screen openings can be short, for example, less than about 10 or 5 cm. The well screen openings can be smaller than the diameter of the trunk, for example, between 1 and 10 cm. The screen can allow gas to escape and blocking the soil from falling out of the soil box. The screen size, e.g., the porosity of the screen or the ratio of the non-blocking portion of the screen, can be between 10 and 90%. The well screens can include continuous-slot (wire wrap) screens of a triangular-shaped wire wrapped around an array of rods. The well screens can have as large a percentage of non-clogging slots as possible to ease the escape of the treatment gas. The well screens can be resistant to corrosion, have sufficient strength to resist collapse, and prevent sand pumping.

In some embodiments, protection portions 2880 can be included to protect the well screen of the cylindrical portions. The cylindrical protection rods 2880 can be slightly smaller than the cylindrical well screen portions 2875. For example, the cylindrical protection rods can be between 40 to 80% of the cylindrical well screen portions, such as about 28 inch diameter for protection rods 2880 in relation to about 10 inch diameter for screen rods 2875. Other configurations can be used, such as similar size or larger size of protection rods as compared to screen rods. For example, the protection rods can be longer, covering the whole length of the soil box, while the diameter of the protection rods is smaller than that of the screen rods. The cylindrical protection rods 2880 can have openings and extend outward to the walls of the soil box, to accept hot gas to the soil box. The protection pipe can be attached on the box wall on one side and strapped to the center to allow for thermal expansion. In some embodiments, to account for thermal expansion mismatch, the protection pipe is not solidly attached to both walls of the soil box, and can leave a small gap for thermal expansion, e.g., the protection pipe may not run all the way across the entire box. In some embodiments, straps or double wall sliding (e.g., one pipe disposed slidably in another pipe) can be used to account for the thermal expansion.

Warming towers 2882 can be coupled to the protection pipes. The warming towers can have openings 2883 for releasing hot gas to the soil. The openings can be placed at the ends of the warming towers, or can be placed anywhere along the lengths of the warming towers.

Alternatively, the warming towers can be provided without the protection pipes. The warming towers can be directly coupled to an outside wall of the soil box for accepting hot gas, and can have openings for releasing hot gas to the soil.

FIGS. 29A-29B illustrate flow charts for thermal desorption processes with minimized condensation contaminants according to some embodiments. In FIG. 29A, operation 2900 provides a soil box, wherein the soil box comprises an inner volume for containing a material, wherein the soil box comprises a top opening for accepting a gas treatment input, wherein the soil box comprises a gas treatment output. Operation 2910 forms one or more gas treatment inlets in the soil box, wherein the gas treatment inlets are disposed between the gas treatment input and the gas treatment output so that a distance from the gas treatment input and the gas treatment output is less than a condensation distance.

In FIG. 29B, operation 2930 loads contaminated soil into a soil box, wherein the soil box comprises a top opening for accepting a gas treatment input, wherein the soil box comprises a gas treatment output, wherein the soil box comprises one or more gas treatment inlets, wherein the gas treatment inlets are disposed between the gas treatment input and the gas treatment output so that a distance from the gas treatment input and the gas treatment output is less than a condensation distance. Operation 2940 brings the loaded soil box to a treatment chamber for treatment. In some embodiments, the condensable distance is between 2 and 4 ft.

In some embodiments, porous elements can be placed inside a screen element, for example, to improve the reliability of the screen element.

Figure 30A:
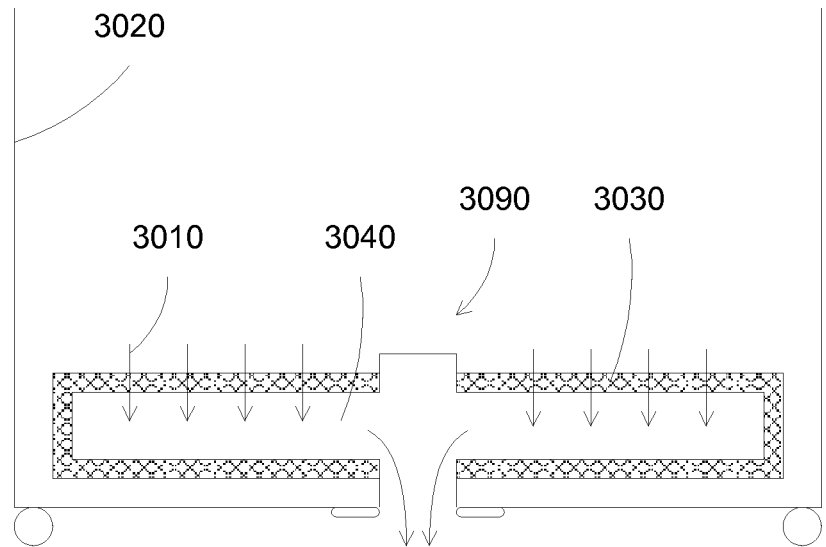
FIGS. 30A-30B illustrate soil boxes having screen exhaust elements with or without porous element stuffing according to some embodiments.
Figure 30B:
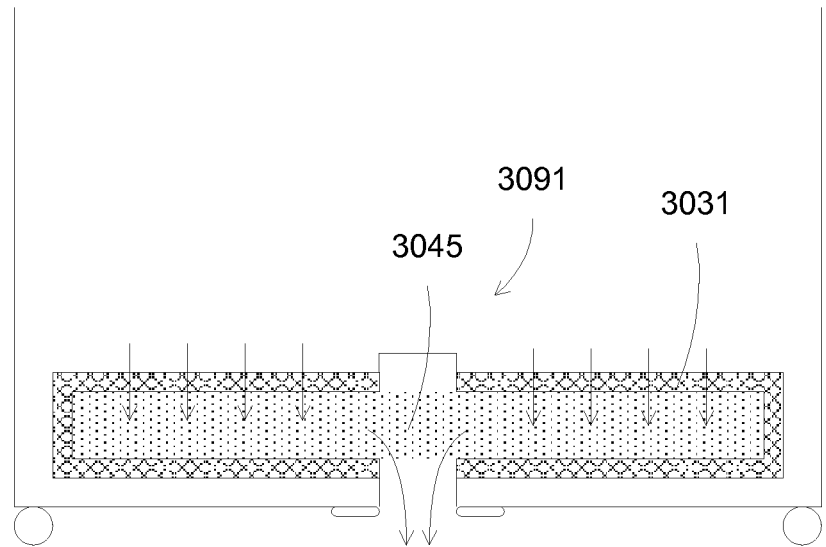

FIGS. 30A-30B illustrate soil boxes having screen exhaust elements with or without porous element stuffing according to some embodiments. In FIG. 30A, a soil box 3020 can include a vapor extraction exhaust 3090 having screen element 3030. Heat gas 3010 can exhaust, e.g., pass through, the screen 3030 to an exhaust conduit. The inside of the vapor extraction exhaust 3090, e.g., inside the screen element 3030 is empty, e.g., the heat gas can have high mean free paths 3040 through the vapor extraction exhaust 3090 to the exhaust conduit.

In FIG. 30B, a soil box can include a vapor extraction exhaust 3091 having screen element 3031. Heat gas can exhaust, e.g., pass through, the screen 3031 to an exhaust conduit. The inside of the vapor extraction exhaust 3091, e.g., inside the screen element 3031, can be filled with a porous material 3045, e.g., the heat gas can have low mean free paths through the vapor extraction exhaust 3091 to the exhaust conduit. The porous material 3045 can be a material having pores, or can be a solid material that, after filling the area inside the vapor extraction exhaust 3091, still leaving pores for exhaust gas to pass through. In some embodiments, the term "porous material" for filling the vapor extraction exhaust is defined as a material that forms a porous volume inside the vapor extraction exhaust. Thus the porous material can be a solid material, as long as the material forms pores inside the vapor extraction exhaust.

FIGS. 31A-31E illustrate an example of a well screen portion for a vapor extraction line according to some embodiments. The vapor extract line 3100 can have a screen cover 3175, which can surround a porous core 3170. The screen cover 3175 can include a screen or a double wall pre-pack well screen with thermally stable filter media in the annulus. The well screen may be a continuous slot screen. The porous core can include a porous material, such as materials having 40-310% open pores.

The end portion of the vapor extract line 3100 can include a screen plate 3130, or a solid plate 3135. A portion 3137 can be included to the end portion 3130 or 3135, for example, to facilitate the attachment of the vapor extraction line 3100 to a middle portion.

In some embodiments, the screen 3175 can have larger inside opening than the outside opening, e.g., the openings area of the screen facing the soil are smaller than the openings of the screen facing the porous material 3170. This configuration can assist in pulling small rocks toward the inner portion of the screen, preventing blockage of the screen.

Figure 32A:
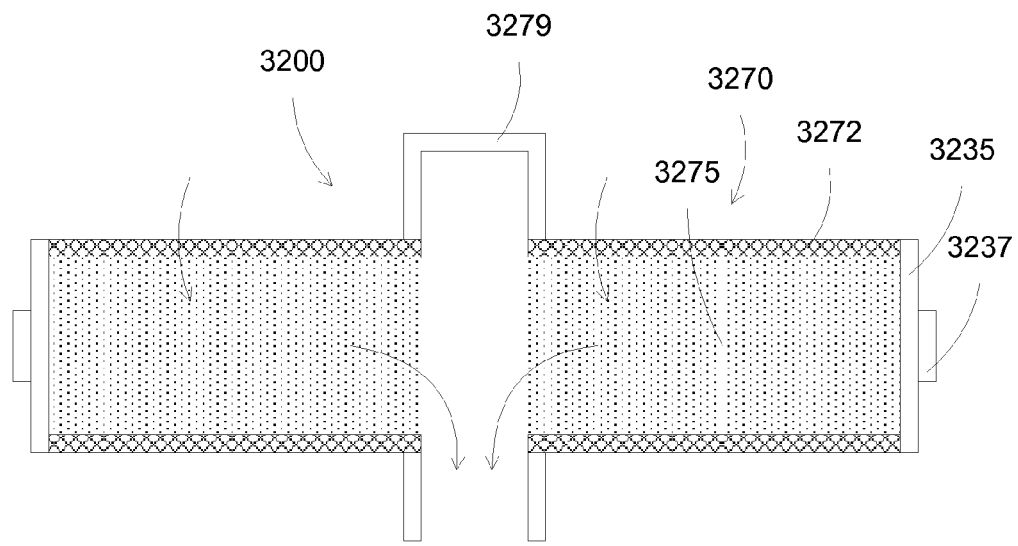
FIGS. 32A-32B illustrate another example of a vapor extraction line according to some embodiments.
Figure 32B:
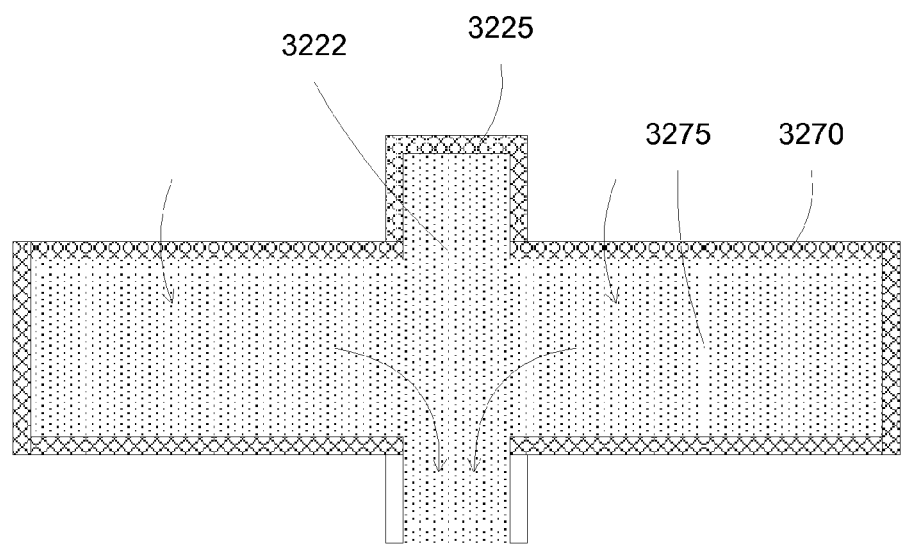

FIGS. 32A-32B illustrate another example of a vapor extraction line according to some embodiments. The vapor extract line 3200 can have middle portion 3279 and cylindrical portions 3270 having screen 3272 covering a porous core 3275. The end portion of the vapor extract line 3200 can include a plate 3235, such as a screen plate or a solid plate. A portion 3237 can be included to the end portion 3235, for example, to facilitate the attachment of the vapor extraction line 3270 to a middle portion 3279. In FIG. 32A, a porous core is provided for the vapor extraction line 3270, with the middle portion 3279 having solid plate and no porous core. In FIG. 32B, a porous core 3222 is provided for the vapor extraction line 3270 and for the middle portion 3225 with screen plate. Other configurations can be used, such as the middle portion 3225 with solid plate, or middle portion 3279 with screen plate.

The porous materials filling the vapor extraction line can be uniform, e.g., having similar size and shape. The porous material can be graded, e.g., having larger sizes near the screen area, and smaller sizes farther the screen area.

Figure 33A:
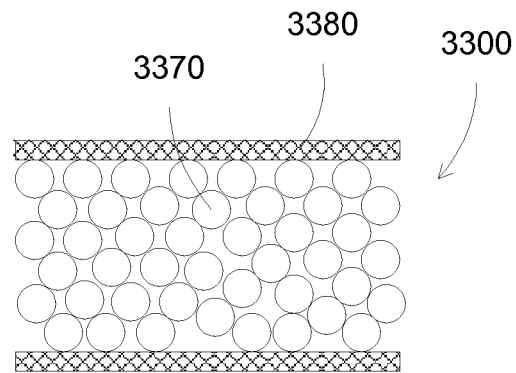
FIGS. 33A-33C illustrate screen elements filling with porous materials according to some embodiments.
Figure 33B:
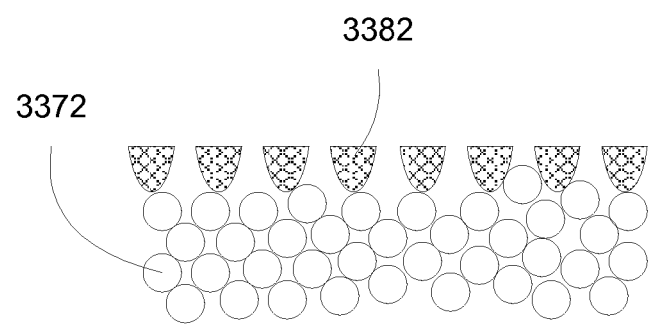
Figure 33C:
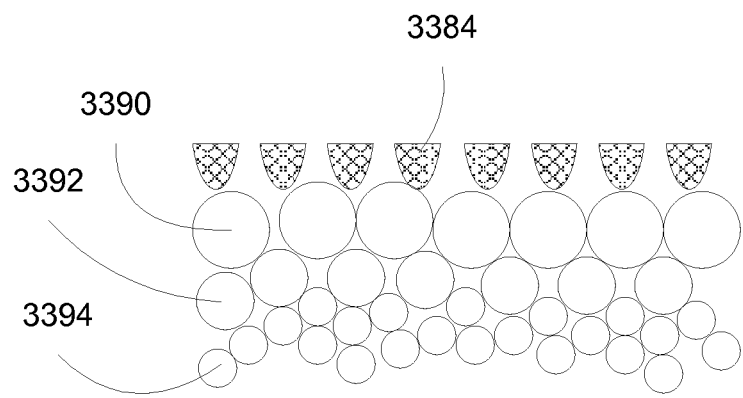

FIGS. 33A-33C illustrate screen elements filling with porous materials according to some embodiments. In FIG. 33A, porous material 3370 can have similar size and shape, for filling the area inside the screen 3380 of the vapor extraction line 3300. FIG. 33B shows an enlarged view, showing the screen 3382 that is configured to confine the porous material 3372.

In FIG. 33C, gradient porous material can be used for filling the volume inside the vapor extraction line. For example, larger spheres 3390 can be placed nearer the screen area 3384, while smaller spheres 3392 and 3394 are placed farther the screen area, e.g., nearer the middle of the screen area.

FIGS. 34A-34B illustrate flow charts for soil box having porous materials in vapor extraction line according to some embodiments. In FIG. 33A, operation 3400 provides a soil box, wherein the soil box comprises an inner volume for containing a material, wherein the soil box comprises an opening input, wherein the soil box comprises a screen output. Operation 3410 fills the screen output with a porous material.

In some embodiments, the opening input can be the top opening. The porous material can fill only the screen area, or can fill whole output area. The porous material can have material dimensions larger than screen opening. The filling of the porous material can result in high pore ratio in the vapor extraction line. The porous material can form gradient pores, e.g., higher pores nearer or farther of the screen area. The porous material can form gradient solid materials, e.g., larger materials nearer or farther of the screen area.

In FIG. 34B, operation 3430 loads contaminated soil into a soil box, wherein the soil box comprises a top opening for accepting a gas treatment input, wherein the soil box comprises a gas treatment output, wherein the soil box comprises one or more gas treatment inlets, wherein the gas treatment inlets are disposed between the gas treatment input and the gas treatment output so that a distance from the gas treatment input and the gas treatment output is less than a condensation distance. Operation 3440 brings the loaded soil box to a treatment chamber for treatment.

In some embodiments, a pedestal support can be provided for connecting the outlet of the soil box with the exhaust of the treatment chamber. The pedestal soil box support can provide ease of installation and removal of the soil box from the insulated treatment chamber. The soil box can have a gas exit pathway located at the bottom of the soil box. The treatment chamber can have an exhaust, which is configured to be coupled to the gas exit pathway to receive the treated gas from the soil box.

In some embodiments, the coupling between the soil box and the treatment chamber, e.g., the connection between the gas exit pathway of the soil box and the exhaust inlet of the treatment chamber, can be configured to be automatically sealed when the soil box is placed in the treatment chamber. The treatment chamber can include a pedestal support, which can be arranged to be aligned with the outlet opening of the gas exit pathway of the soil box. The pedestal support can also have an opening inlet, which can be configured to mate with the opening outlet of the gas exit pathway.

In some embodiments, the connection of the gas exit pathway to the exhaust inlet can be to place the soil box on the pedestal support. Once installed, the weight of the contained soil can provide a sufficient seal at the contact between the soil box bottom and the pedestal soil box support. Sealing materials, such as soft braided rings, can be included to either the outlet opening of the gas exit pathway or the inlet opening of the exhaust pathway to reduce potential leakage. Vacuum and/or pressurized gas can also be included to assist in improving the seal, such as to suck down the seal gasket or to lift the gasket against the soil box.

The pedestal support, together with the gasket seal, can facilitate the docking of the soil box in the treatment chamber, providing simple alignment of the soil box outlet with the treatment chamber inlet exhaust. The pedestal support can include a raised structure for resting the soil box in the treatment chamber. The raised structure can include a gasket sealed connection to the vapor extraction line leading to the vapor treatment arrangement. The pedestal connection can be configured to compensate for thermal expansion between the soil box opening and the vapor extraction line leading to vapor treatment. In some embodiments, the pedestal connection can eliminates the need for physical connection operations.

Figure 35A:
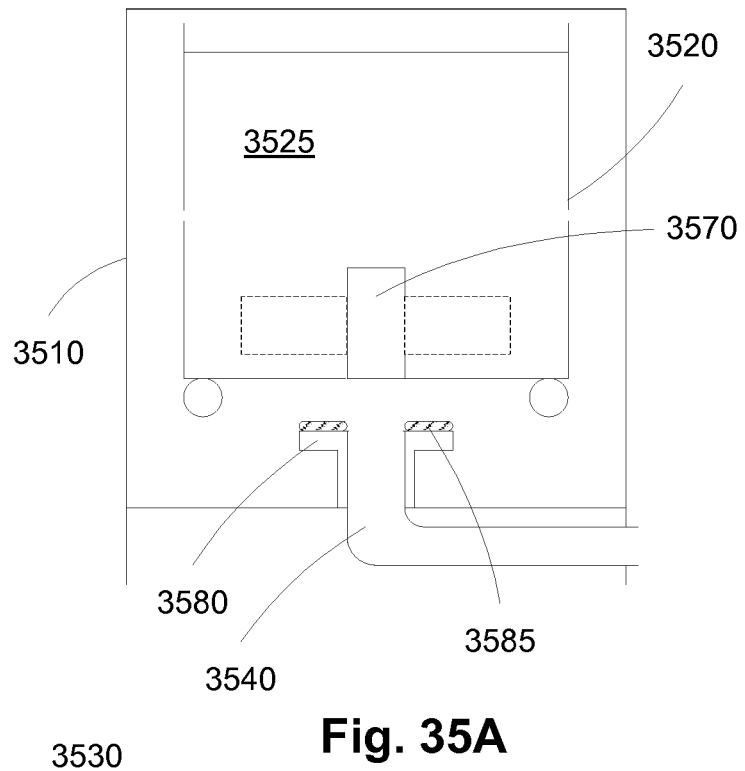
FIGS. 35A-35B illustrate a pedestal support for a soil box according to some embodiments.
Figure 35B:
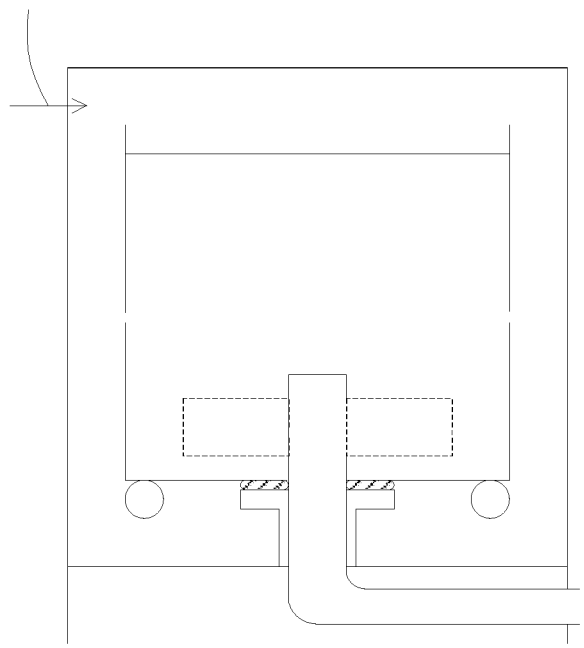

FIGS. 35A-35B illustrate a pedestal support for a soil box according to some embodiments. The soil box 3520, containing contaminated soil 3525, can be placed in a treatment chamber 3510, which accepts a hot and dry treatment gas 3530. The soil box 3520 can contain a gas exit pathway 3570 located near the bottom of the soil box. The gas exit pathway 3570 of the soil box 3520 can be coupled to an exhaust 3540 to exit the treatment chamber. A pedestal support 3580 can be used to facilitate the connection between the gas exit pathway 3570 and the exhaust 3540. A seal gasket 3585 can be optionally installed to improve the seal between the gas exit pathway 3570 and the exhaust 3540.

The soil box can be delivered to the treatment chamber, for example, by a fork lift. The soil box can be positioned above the pedestal support 3580. The seal gasket can be installed in the soil box or in the pedestal support.

Figures 36A, 36B:
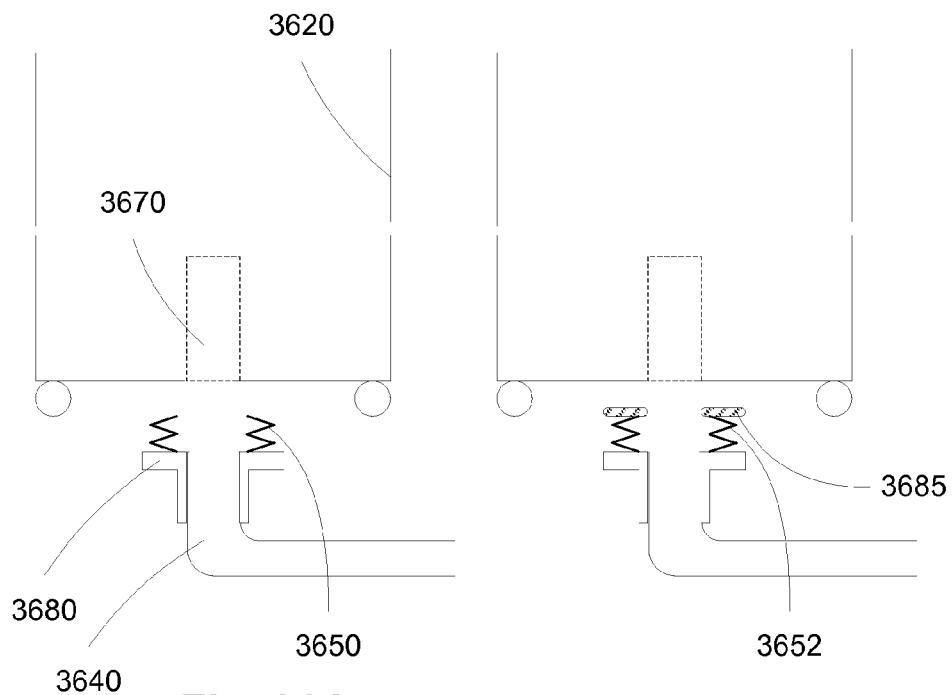
FIGS. 36A-36D illustrate different sealing configurations between a soil box and a pedestal support according to some embodiments.
Figures 36C, 36D:
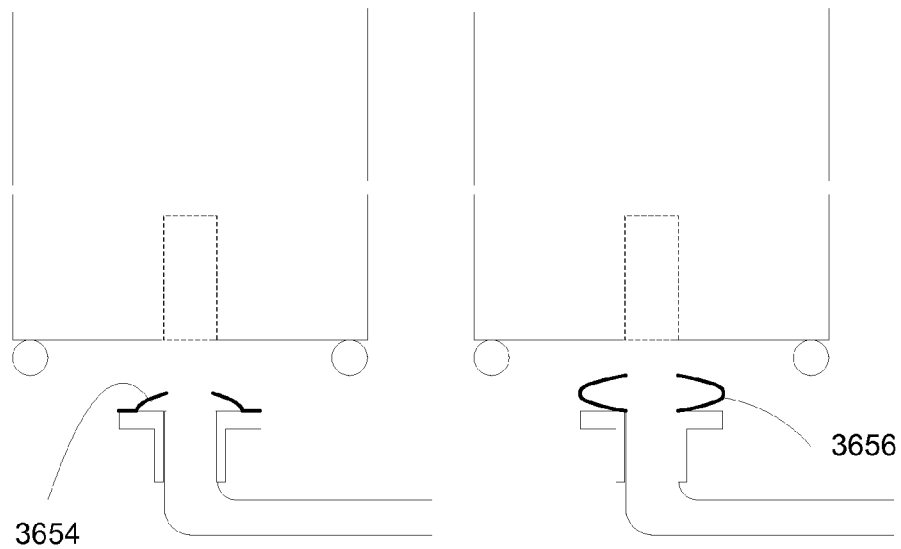

FIGS. 36A-36D illustrate different sealing configurations between a soil box and a pedestal support according to some embodiments. In FIG. 36A, a spring or bellow 3650 can be coupled to a pedestal support 3680, which can allow sealing between a vapor extraction line 3670 of a soil box 3620 with an exhaust line 3640 of a treatment chamber. In FIG. 36B, a gasket seal 3685 can be placed on the spring or bellow 3652 to improve the sealing of the soil box. The gasket seal 3685 can also be coupled to the soil box. In FIGS. 36C and 36D, a one-piece diaphragm 3654 or a two piece diaphragm 3656 with optional gasket seals can be used to form the seal to the soil box.

Figure 37A:
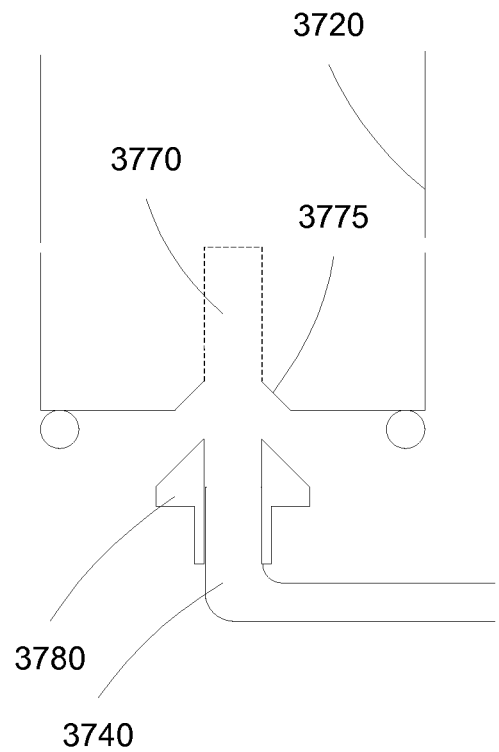
FIGS. 37A-37B illustrate another sealing configuration between a soil box and a pedestal support according to some embodiments.
Figure 37B:
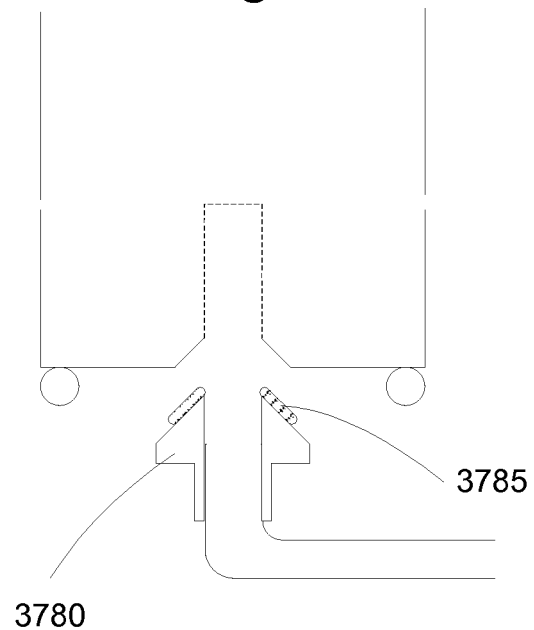

FIGS. 37A-37B illustrate another sealing configuration between a soil box and a pedestal support according to some embodiments. The vapor extraction line 3770 of a soil box 3720 can include a cone shape connection 3775 at the bottom. The pedestal support 3780 can include a mated cone shape portion 3780, which when the soil box is placed on the pedestal support 3780, forms a seal between the vapor extraction line 3770 with the exhaust line 3740. An optional gasket seal 3785 can be used to improve the seal.

In some embodiments, the soil box can have handles to be handled by a machine, such as a fork lift. The handles can be designed to avoid trapping of soil, for example, by having holes at the bottom.

Figure 38A:
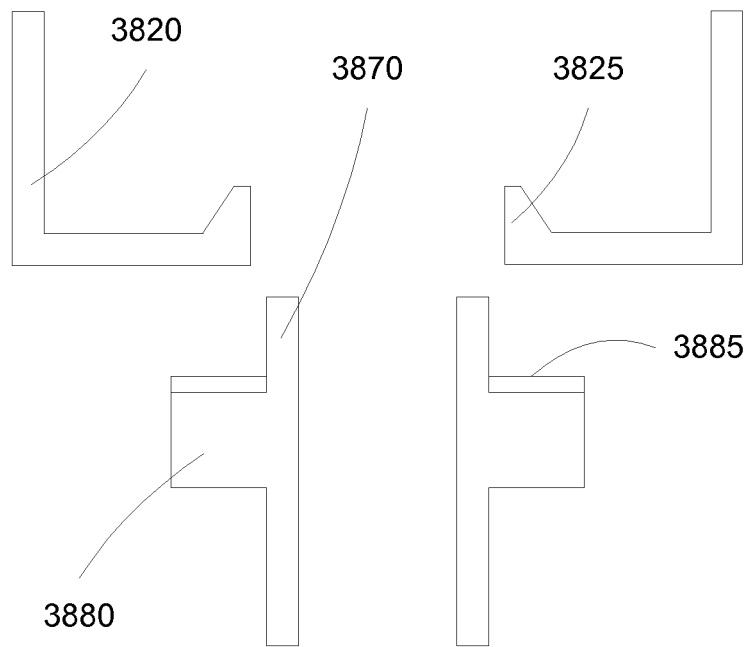
FIGS. 38A-38B illustrate a sealing configuration between a soil box and a pedestal support according to some embodiments.
Figure 38B:
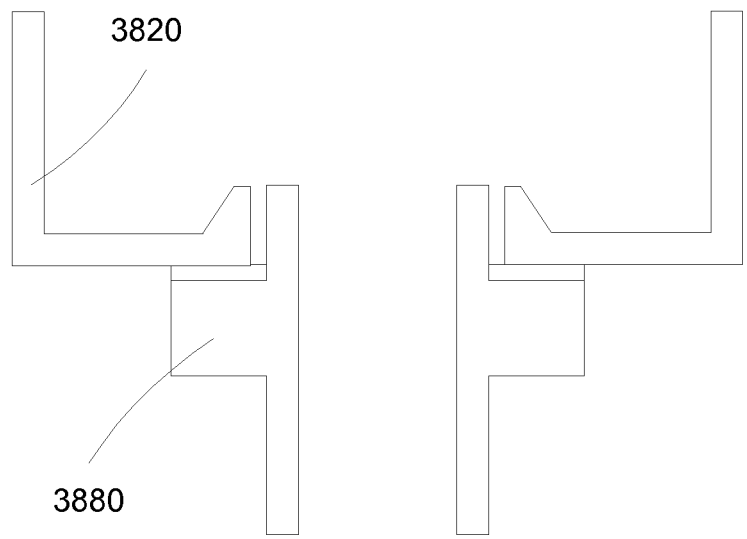

FIGS. 38A-38B illustrate a sealing configuration between a soil box and a pedestal support according to some embodiments. FIG. 38A shows a separation configuration between the soil box 3820 and the pedestal support 3880. FIG. 38B shows a mating configuration between the soil box 3820 and the pedestal support 3880. A protrusion 3870 can be provided at the top of the pedestal support for ease of mating with the opening of the soil box. A gasket seal 3885 can be placed on the pedestal support to improve the sealing of the soil box. The gasket seal 3885 can also be coupled to the soil box. The soil box 3820 can include portion 3825 for strengthening to opening, which then mate with the protrusion 3870 of the pedestal support 3880.

Figure 39A:
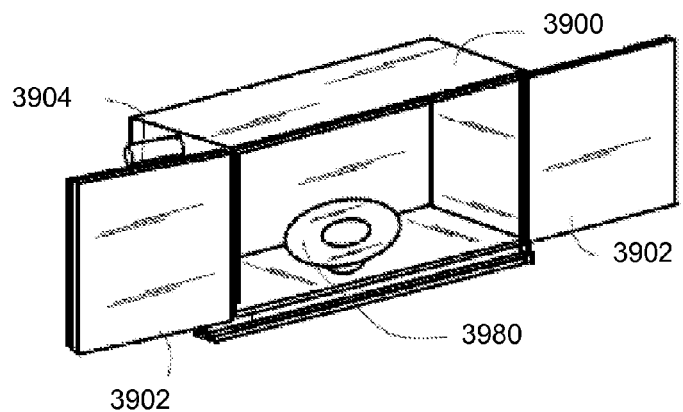
FIGS. 39A-39B and 40A-40B illustrate a soil box according to some embodiments.

FIGS. 39A-39B and 40A-40B illustrate a soil box according to some embodiments. FIG. 39A shows that one end of the treatment chamber 3900 contains an opening that allows one or more soil boxes 3910 to be inserted and removed from the treatment chamber. Soil boxes can be approximately 5 feet high, 5 feet wide, and up to 40 feet long, but may be as small as 8 feet long, in which case the treatment chamber is configured to hold two or more of them. The soil box can be inserted into the housing treatment chamber and removed by rolling or sliding the vessel via forklift or modified loader. Doors 3902 can be provided. A gas delivery conduit 3904 can be provided at a side of the treatment chamber. A pedestal support 3980 can be provided for mating with the soil box.

Figure 39B:
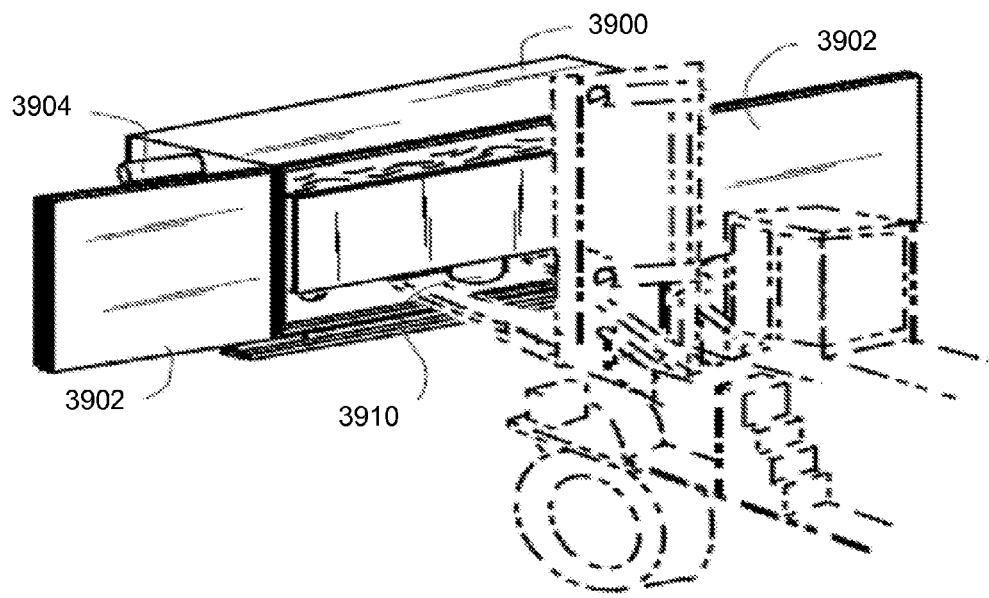

FIG. 39B illustrates this process with a single treatment chamber. A forklift or modified loader is used to transport the soil box and the soil contained in it to and from the treatment chamber location. The contaminated soil, once loaded in the soil box at the contamination site, is not removed from the soil box until treatment is complete and it is ready to be returned to a soil disposition site.

Figure 40A:
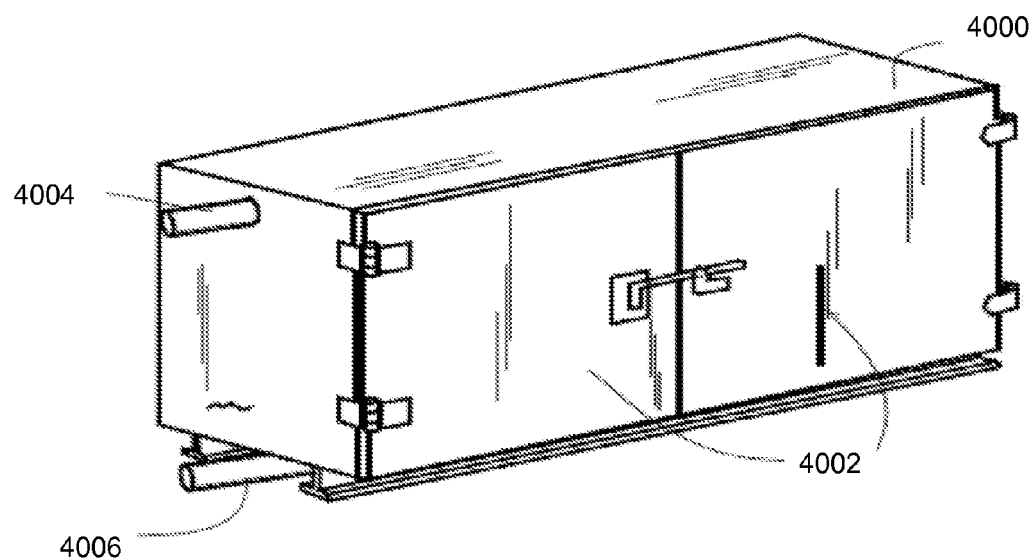
Figure 40B:
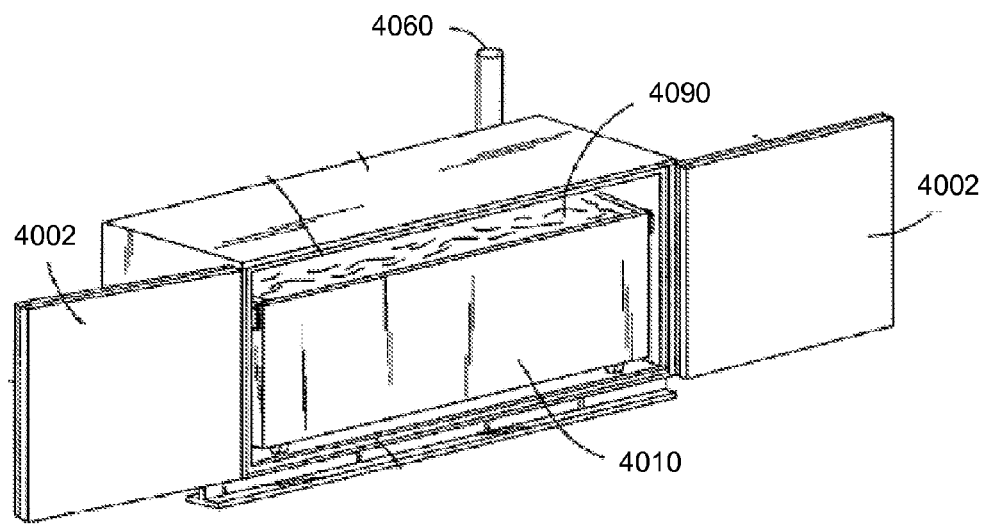

FIG. 40A shows the insulated treatment chamber 4000 with the insulated treatment chamber closure 4002 in the closed position. FIG. 40B shows the insulated treatment chamber closure in the open position. In the open position the soil box 4010, filled with soil 4090 can be easily installed or removed, for example, by a fork lift or a loader 4006. A gas delivery conduit 4004 can provide hot dray treatment gas to the chamber. An explosion relief vent 4060 provides for venting of the pressurized content of the treatment chamber 4000 in the event of rapid pressure increase. The relief vent 4060 can direct the expelled gasses upward.

FIGS. 41A-41B illustrate flow charts for thermal desorption processes having pedestal supports according to some embodiments. In FIG. 41A, operation 4100 forms a treatment chamber, wherein the treatment chamber is configured to accept a soil box, wherein the soil box comprises a soil box outlet, wherein the treatment comprises an exhaust outlet to be mated to the soil box output. Operation 4110 forms a pedestal support on an inner side of the exhaust outlet for sealing with the soil box outlet.

In FIG. 41B, operation 4130 loads contaminated soil into a soil box, wherein the soil box comprises a soil box outlet. Operation 4140 brings the loaded soil box to a treatment chamber, wherein the soil box outlet is mated with an exhaust outlet of the treatment chamber through a pedestal support for sealing.

FIGS. 42A-42C illustrate an example of a soil box having handles according to some embodiments. A soil box 4220 can have a vapor extraction lines 4270 installed at the bottom of the soil box. Fork pockets 4260 can be placed at the bottom or at sides of the soil box. The fork pockets can be configured to be used with a fork lift. The fork pockets 4260 can have openings 4265 to avoid soil trapping.

Figure 43A:
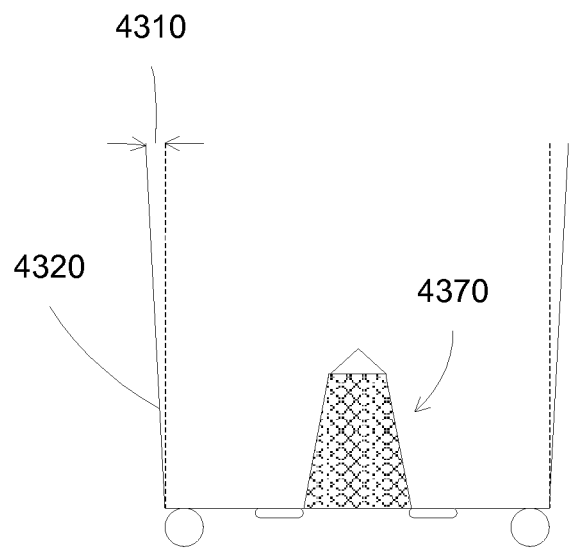
FIGS. 43A-43B illustrate another example of a soil box according to some embodiments.
Figure 43B:
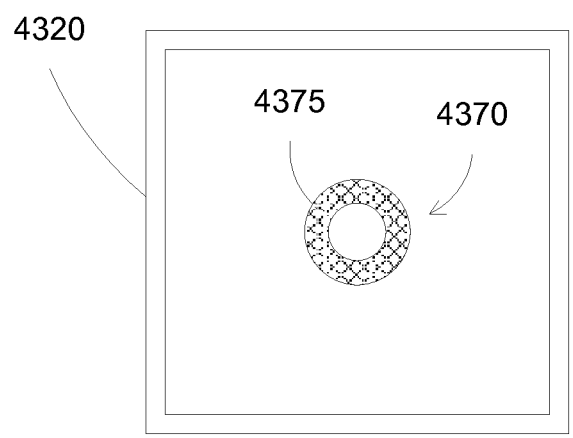

FIGS. 43A-43B illustrate another example of a soil box according to some embodiments. The soil box 4320 can include a vapor extract line 4370 disposed in the middle of the soil box. In addition to the slanted angle of the vapor extraction line 4370, the soil box 4320 also can have slanted angle sides, for example, making an angle from the vertical. The slanted sides, instead of vertical side, can assist in releasing soil from the soil box during a dumping operation. The slanted angles can be between 0.2 and 5 degrees, such as between 0.5 and 2 degrees. For example, a soil box can have dimensions of 5 ft wide by 8 ft length by 5.5 ft height, and the soil box side can be slanted so that the top opening 4310 can be about 1 inch wider. A cone shape vapor extraction line 4370 is shown, but other shapes can be used, such as a cylindrical shape 4375, or other shapes shown above.

Operation of the evaporative desorption soil contaminate removal and contaminate reclamation apparatus begins with opening the insulated treatment chamber closure and installing a soil box containing contaminated soil. The closure is closed and the treatment gas is introduced. As treatment gas flows, the gas extraction fan can be placed into service.

The treatment gas inlet and outlet temperatures are monitored as the inlet temperature increases to the desired operating temperature. The cooling of the heat exchangers and the flow through the gas extraction fan may be varied to maintain the desired operating temperature and to regulate the fuel consumption of the thermal oxidizer.

The dry, hot treatment gas entering the chamber flows around the thermal conductive soil box, heating the vessel and the soil within by conduction through the vessel sides. It flows to the soil exposed in the top of the soil box, then flows through the soil, transferring heat by direct contact, and acquiring (desorbing) volatile contaminants as it travels through the soil to the slotted or perforated piping gas exit pathway in the lower part of the soil box. The combination of heat conduction through the walls and floor of the soil box and heat convection from the flow of hot, dry air down through the soil tends to heat the soil evenly, treating it uniformly. The hot air containing volatile contaminants then flows out the gas exit pathway penetration to exit the treatment chamber.

When the treatment chamber outlet temperature falls substantially, and the thermal oxidizer requires substantial energy, it is indicative that the treatment has completed its final stage. The thermal oxidizer energy supply is then turned off to initiate shutdown. When the treatment chamber is sufficiently cooled, the heat exchangers and the gas extraction fan are turned off. The soil box containing clean soil may then be removed.

What is claimed is:

1. A soil box for a thermal desorption process, the soil box comprising
   a container,
      wherein the container comprises one or more walls,
      wherein the container comprises an inner volume for containing a material,
      wherein the container comprises an opening inlet,
      wherein the opening inlet is configured to accept a treatment gas to the container,
      wherein the container comprises an opening outlet,
      wherein the opening outlet is configured to exhaust the treatment gas from the container;
   a screen element coupled to the opening outlet,
      wherein the screen element is configured so that the treatment gas forms a substantially uniform flow through the material on the path from the opening inlet to the opening outlet, and
   wherein the container comprises one or more holes on the one or more walls.

2. A soil box as in claim 1
   wherein the substantially uniform flow comprises a parallel flow from a top side of the container to a bottom side of the container.

3. A soil box as in claim 1
   wherein the substantially uniform flow comprises parallel flow from a top side of the container to a bottom side of the container together with a radial flow from the one or more walls.

4. A soil box for a thermal desorption process, the soil box comprising
   a container,
      wherein the container comprises one or more walls,
      wherein the container comprises an inner volume for containing a soil material,
      wherein the container comprises an opening top side,
      wherein the container comprises an opening outlet,
      wherein the container comprises one or more holes on the one or more walls,
      wherein the opening outlet is configured to exhaust a treatment gas from the opening top side;
   a screen,
      wherein the screen is disposed along and space apart from a bottom side of the container,
      wherein the screen is configured to support the soil material,
      wherein the screen element is configured so that the treatment gas forms a substantially uniform flow through the soil material on the path from the opening top side to the opening outlet.

5. A soil box as in claim 4
   wherein the screen comprises a curve plate.

6. A soil box as in claim 4
   wherein the screen comprises a hole density, wherein the hole density is configured so that a flow conductance of the treatment gas through the screen is substantially similar to a flow conductance of the treatment gas through the soil material.

7. A soil box as in claim 4
   wherein the soil box is configured to be placed in a cradle in a treatment chamber, wherein the cradle comprises an inlet for accepting a hot gas input, wherein the cradle comprises an outlet for delivering a hot gas output toward a side of the soil box.

8. A soil box for a thermal desorption process, the soil box comprising
   a container,
      wherein the container comprises one or more walls,
      wherein the container comprises an inner volume for containing a soil material,
      wherein the container comprises an opening top side,
      wherein the container comprises an opening outlet,
      wherein the opening outlet is configured to exhaust a treatment gas from the opening top side;
   a screen element coupled to a bottom side of the container,
      wherein the screen element comprises one or more screen tubes,
      wherein the screen tubes are disposed substantially parallel to the bottom side,
      wherein the screen element is configured so that the treatment gas forms a substantially uniform flow through the soil material on the path from the opening top side to the screen element to the opening outlet, wherein the container comprises one or more holes on the one or more walls.

9. A soil box as in claim 8 wherein the screen element comprises a cylindrical tube.

10. A soil box as in claim 8 wherein the soil box is configured to be placed in a cradle in a treatment chamber, wherein the cradle comprises an inlet for accepting a hot gas input, wherein the cradle comprises an outlet for delivering a hot gas output toward a side of the soil box, wherein the cradle is configured to constrain the soil box so that the opening outlet is mated with an outlet conduit of a treatment chamber when the soil box is placed in the cradle.

11. A soil box as in claim 8 further comprising an element disposed in the inner volume, wherein the element comprises an inlet for accepting a hot gas input, wherein the element comprises an outlet for delivering a hot gas output toward the inner volume, wherein the hot gas output is configured to minimize a condensation front from the treatment gas.

12. A soil box for a thermal desorption process, the soil box comprising
a container,
wherein the container comprises one or more walls,
wherein the container comprises an inner volume for containing a soil material,
wherein the container comprises an opening top side,
wherein the container comprises an opening outlet,
wherein the opening outlet is configured to exhaust a treatment gas from the opening top side;
a screen,
wherein the screen is disposed along and space apart from a bottom side of the container,
wherein the screen is configured to support the soil material,
wherein the screen element is configured so that the treatment gas forms a substantially uniform flow through the soil material on the path from the opening top side to the opening outlet,
a pedestal coupled to the bottom side, wherein the pedestal surrounds the opening outlet, wherein the pedestal is operable to form a seal with an outlet conduit of a treatment chamber by the weight of the soil box.

13. A soil box for a thermal desorption process, the soil box comprising
a container,
wherein the container comprises one or more walls,
wherein the container comprises an inner volume for containing a soil material,
wherein the container comprises an opening top side,
wherein the container comprises an opening outlet,
wherein the opening outlet is configured to exhaust a treatment gas from the opening top side;
a screen,
wherein the screen is disposed along and space apart from a bottom side of the container,
wherein the screen is configured to support the soil material,
wherein the screen element is configured so that the treatment gas forms a substantially uniform flow through the soil material on the path from the opening top side to the opening outlet,
a plate disposed in the inner volume, wherein the plate is substantially perpendicular to the bottom side, wherein the plate comprises an inlet for accepting a hot gas input, wherein the plate comprises an outlet for delivering a hot gas output toward the inner volume, wherein the plate is operable to minimize a condensation front from the treatment gas.

14. A soil box for a thermal desorption process, the soil box comprising
a container,
wherein the container comprises one or more walls,
wherein the container comprises an inner volume for containing a soil material,
wherein the container comprises an opening top side,
wherein the container comprises an opening outlet,
wherein the opening outlet is configured to exhaust a treatment gas from the opening top side;
a screen,
wherein the screen is disposed along and space apart from a bottom side of the container,
wherein the screen is configured to support the soil material,
wherein the screen element is configured so that the treatment gas forms a substantially uniform flow through the soil material on the path from the opening top side to the opening outlet,
a porous material disposed near the screen element at an opposite side of the soil material.

15. A soil box for a thermal desorption process, the soil box comprising
a container,
wherein the container comprises one or more walls,
wherein the container comprises an inner volume for containing a soil material,
wherein the container comprises an opening top side,
wherein the container comprises an opening outlet,
wherein the opening outlet is configured to exhaust a treatment gas from the opening top side;
a screen,
wherein the screen is disposed along and space apart from a bottom side of the container,
wherein the screen is configured to support the soil material,
wherein the screen element is configured so that the treatment gas forms a substantially uniform flow through the soil material on the path from the opening top side to the opening outlet,
a porous material disposed near the screen element at an opposite side of the soil material, wherein the porous material forms gradient material with larger materials nearer the screen element.

16. A soil box for a thermal desorption process, the soil box comprising
a container,
wherein the container comprises one or more walls,
wherein the container comprises an inner volume for containing a soil material,
wherein the container comprises an opening top side,
wherein the container comprises an opening outlet,
wherein the opening outlet is configured to exhaust a treatment gas from the opening top side;
a screen element coupled to a bottom side of the container,
wherein the screen element comprises one or more screen tubes,
wherein the screen tubes are disposed substantially parallel to the bottom side,
wherein the screen element is configured so that the treatment gas forms a substantially uniform flow through the soil material on the path from the opening top side to the screen element to the opening outlet, a pedestal coupled to the bottom side, wherein the pedestal surrounds the opening outlet, wherein the pedestal is operable to form a seal with an outlet conduit of a treatment chamber by the weight of the soil box.

17. A soil box for a thermal desorption process, the soil box comprising
- a container,
    - wherein the container comprises one or more walls,
    - wherein the container comprises an inner volume for containing a soil material,
    - wherein the container comprises an opening top side,
    - wherein the container comprises an opening outlet,
    - wherein the opening outlet is configured to exhaust a treatment gas from the opening top side;
- a screen element coupled to a bottom side of the container,
    - wherein the screen element comprises one or more screen tubes,
    - wherein the screen tubes are disposed substantially parallel to the bottom side,
    - wherein the screen element is configured so that the treatment gas forms a substantially uniform flow through the soil material on the path from the opening top side to the screen element to the opening outlet,
- a porous material disposed near the screen element at an opposite side of the soil material.

18. A soil box for a thermal desorption process, the soil box comprising
- a container,
    - wherein the container comprises one or more walls,
    - wherein the container comprises an inner volume for containing a soil material,
    - wherein the container comprises an opening top side,
    - wherein the container comprises an opening outlet,
    - wherein the opening outlet is configured to exhaust a treatment gas from the opening top side;
- a screen element coupled to a bottom side of the container,
    - wherein the screen element comprises one or more screen tubes,
    - wherein the screen tubes are disposed substantially parallel to the bottom side,
    - wherein the screen element is configured so that the treatment gas forms a substantially uniform flow through the soil material on the path from the opening top side to the screen element to the opening outlet,
- a porous material disposed near the screen element at an opposite side of the soil material, wherein the porous material forms gradient material with larger materials nearer the screen element.

* * * * *